(12) United States Patent
Pan et al.

(10) Patent No.: US 11,589,254 B2
(45) Date of Patent: *Feb. 21, 2023

(54) METHOD AND APPARATUS FOR REQUESTING SIDELINK RADIO BEARER (SLRB) CONFIGURATION OF UNICAST TRANSMISSION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,988

(22) Filed: Dec. 17, 2020

(65) Prior Publication Data

US 2021/0105653 A1   Apr. 8, 2021

Related U.S. Application Data

(63) Continuation of application No. 16/851,916, filed on Apr. 17, 2020, now Pat. No. 10,904,787.

(60) Provisional application No. 62/842,179, filed on May 2, 2019.

(51) Int. Cl.
   *H04W 28/02*    (2009.01)
   *H04W 4/40*     (2018.01)
   *H04W 76/27*    (2018.01)
   *H04W 92/18*    (2009.01)

(52) U.S. Cl.
   CPC ......... *H04W 28/0263* (2013.01); *H04W 4/40* (2018.02); *H04W 28/0268* (2013.01); *H04W 76/27* (2018.02); *H04W 92/18* (2013.01)

(58) Field of Classification Search
   CPC . H04W 72/02; H04W 72/0406; H04W 48/16; H04W 76/27; H04W 92/18; H04W 76/11; H04W 8/24; H04W 24/10; H04W 76/14; H04W 8/30; H04W 8/22; H04W 4/40; H04W 80/08; H04W 28/0268; H04W 28/06; H04W 4/06; H04W 28/02; H04L 47/24
   USPC ........................................................ 370/329
   See application file for complete search history.

(56) References Cited

U.S. PATENT DOCUMENTS

| | | | | |
|---|---|---|---|---|
| 10,187,909 B2 * | 1/2019 | Yi | ........................ | H04W 12/033 |
| 10,687,376 B2 * | 6/2020 | Pan | ........................ | H04W 76/15 |
| 11,252,598 B2 * | 2/2022 | Pan | ........................ | H04W 76/27 |
| 2018/0132161 A1 * | 5/2018 | Lee | ........................ | H04W 76/14 |
| 2019/0110327 A1 * | 4/2019 | Yi | ........................ | H04W 12/02 |
| 2019/0124015 A1 * | 4/2019 | Loehr | .................. | H04L 69/321 |

(Continued)

*Primary Examiner* — Man U Phan
(74) *Attorney, Agent, or Firm* — Skaar Ulbrich Macari, P.A.

(57) ABSTRACT

A method and apparatus are disclosed from the perspective of a first UE (User Equipment) to request SLRB (Sidelink Radio Bearer) configuration for a unicast link with a second UE. In one embodiment, the method includes the first UE receiving a first message from the second UE, wherein the first message includes a first SLRB configuration for the unicast link. The method further includes the first UE transmitting a second message to a network node to request a second SLRB configuration for the unicast link when the first message is received or a successful transmission of a complete message associated with the first message to the second UE is confirmed.

18 Claims, 25 Drawing Sheets

(56) References Cited

U.S. PATENT DOCUMENTS

| | | | | |
|---|---|---|---|---|
| 2019/0342895 A1* | 11/2019 | Loehr | ................... | H04W 72/00 |
| 2020/0107218 A1* | 4/2020 | Wang | ..................... | H04W 4/40 |
| 2020/0229198 A1* | 7/2020 | Kung | ................. | H04W 72/042 |
| 2020/0296619 A1* | 9/2020 | Pan | ...................... | H04W 76/27 |
| 2020/0322774 A1* | 10/2020 | Vargas | .................... | H04W 4/40 |
| 2020/0323019 A1* | 10/2020 | Vargas | ................ | H04B 1/0064 |
| 2021/0144791 A1* | 5/2021 | Kang | ................... | H04W 76/18 |

* cited by examiner

METHOD AND APPARATUS FOR REQUESTING SIDELINK RADIO BEARER (SLRB) CONFIGURATION OF UNICAST TRANSMISSION IN A WIRELESS COMMUNICATION SYSTEM

CROSS-REFERENCE TO RELATED APPLICATIONS

The present Application is a continuation of U.S. patent application Ser. No. 16/851,916, filed Apr. 17, 2020 and now U.S. Pat. No. 10,904,787, which claims priority to and the benefit of U.S. Provisional Patent Application Ser. No. 62/842,179, filed May 2, 2019, the entire disclosure of each referenced application fully incorporated herein by reference.

FIELD

This disclosure generally relates to wireless communication networks, and more particularly, to a method and apparatus for requesting SLRB configuration of unicast transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first UE (User Equipment) to request SLRB (Sidelink Radio Bearer) configuration for a unicast link with a second UE. In one embodiment, the method includes the first UE receiving a first message from the second UE, wherein the first message includes a first SLRB configuration for the unicast link. The method further includes the first UE transmitting a second message to a network node to request a second SLRB configuration for the unicast link when the first message is received or a successful transmission of a complete message associated with the first message to the second UE is confirmed.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project"

referred to herein as 3GPP, including: 3GPP RAN2 #104 Chairman's Note; TR 23.786 V1.0.0, "Study on architecture enhancements for EPS and 5G System to support advanced V2X services"; TS 36.321 V15.3.0, "Evolved Universal Terrestrial Radio Access (E-UTRA); Medium Access Control (MAC) protocol specification"; R2-1900370, "Summary of Email Discussion [104 #58][NR V2X]—QoS support for NR V2X"; TS 36.300 V15.3.0, "Evolved Universal Terrestrial Radio Access (E-UTRA) and Evolved Universal Terrestrial Radio Access Network (E-UTRAN); Overall description"; TS 36.331 V15.3.0, "Evolved Universal Terrestrial Radio Access (E-UTRA); Radio Resource Control (RRC); Protocol Specification"; TS 23.303 V15.1.0, "Proximity-based services (ProSe); Stage 2"; R2-1904707, "On lower layer IDs", Ericson; TS 33.303 V15.0.0, "Proximity-based Services (ProSe); Security aspects"; R2-1904094, "Support of RLC AM for unicast and related SLRB configuration", Huawei; R2-1903227, "Contents and handling of PC5-RRC configuration", MediaTek; and 3GPP Summary of [105bis #32] PC5-RRC signalling, OPPO. The standards and documents listed above are hereby expressly incorporated by reference in their entirety.

Figure 1:
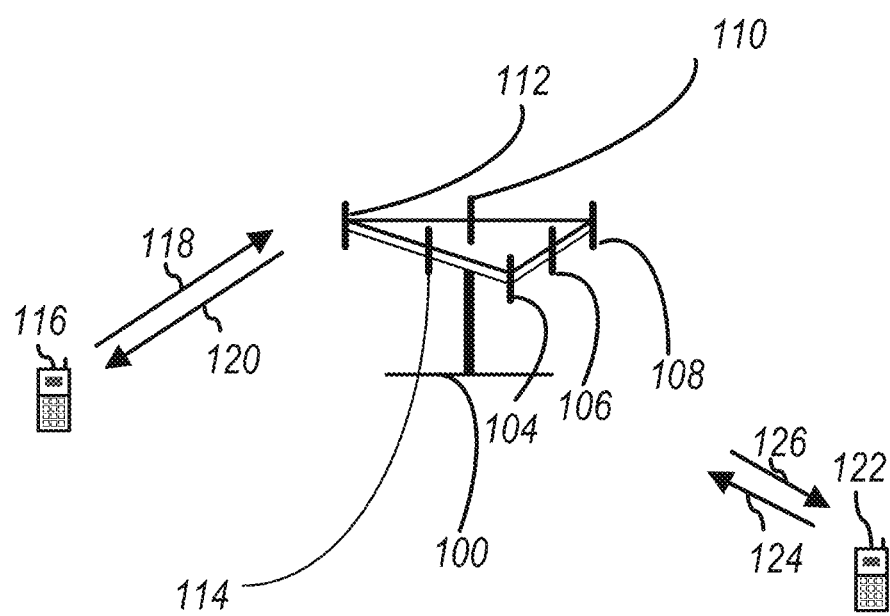
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
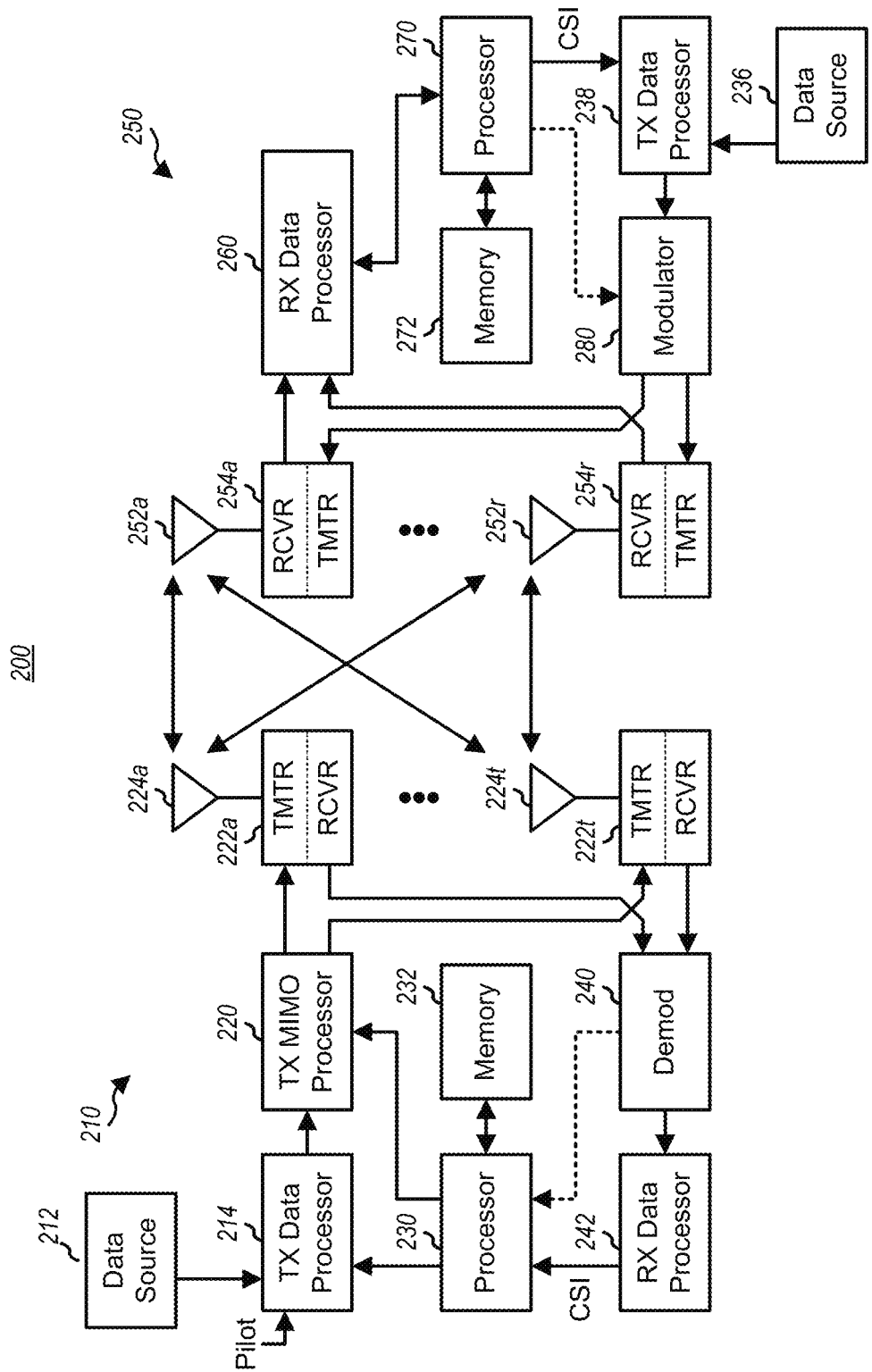
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
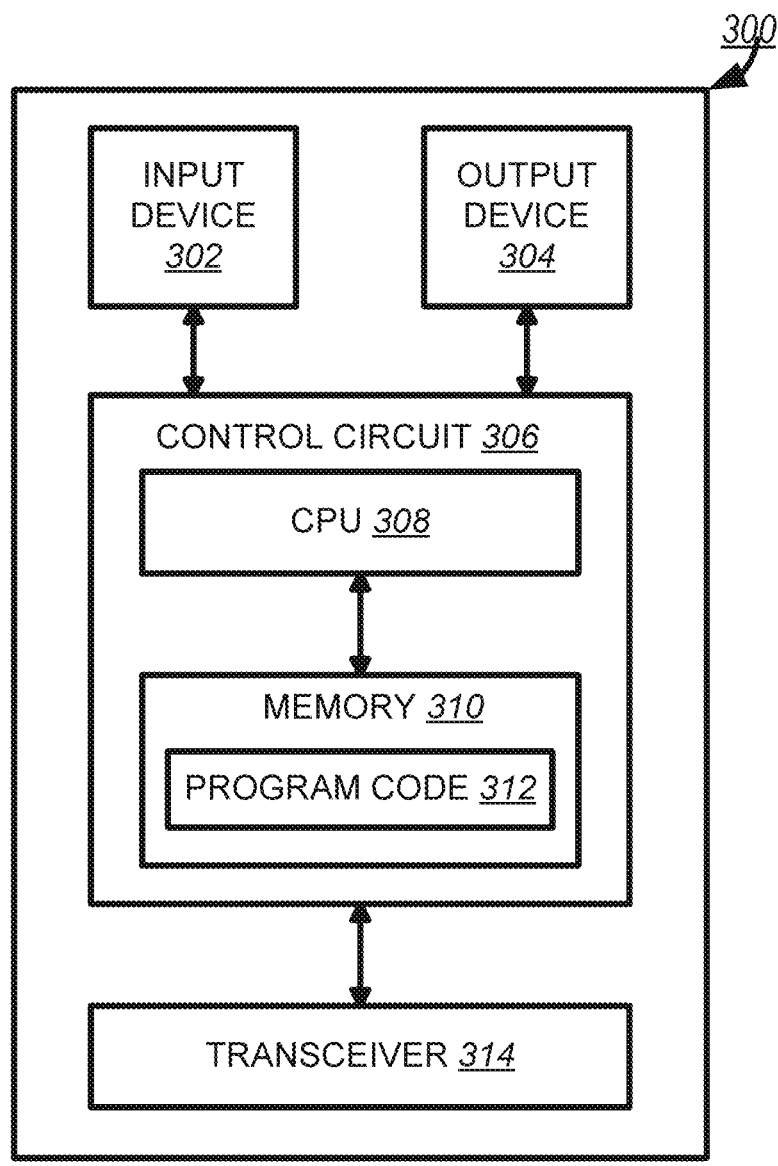
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
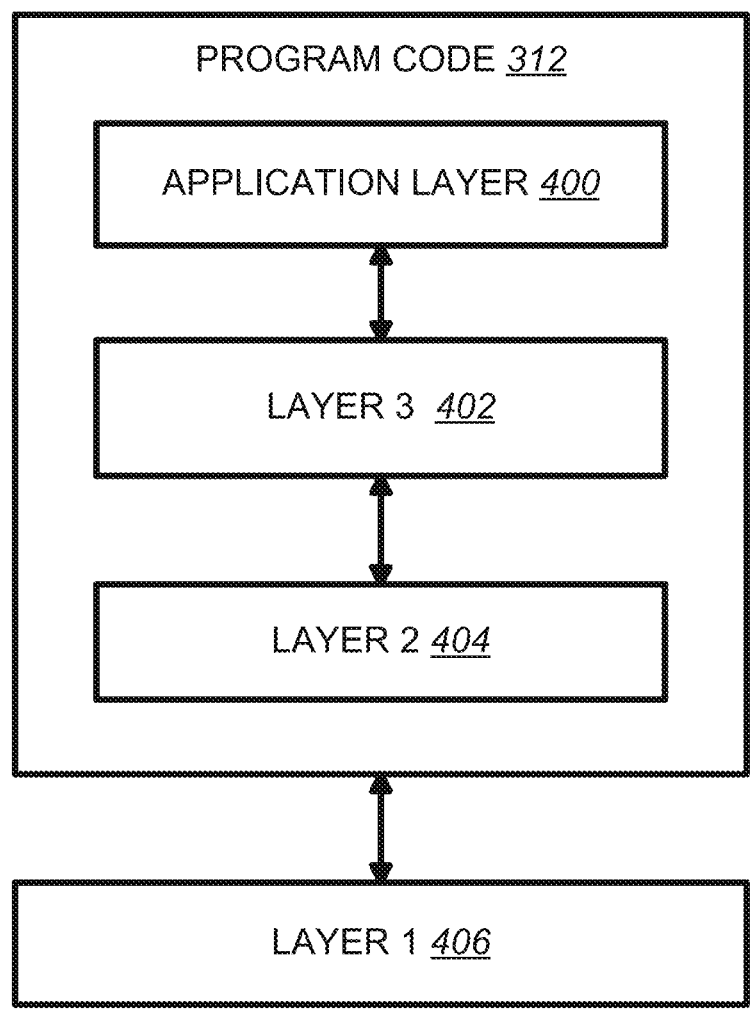
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP RAN2 #104 meeting made the following agreements on NR eV2X sidelink communications as discussed in the 3GPP RAN2 #104 Chairman's note:

3GPP TR 23.786 introduced the following solutions for eV2X communications:
6.11 Solution #11: Solution for Unicast or Multicast for eV2X Communication over PC5 Reference Point
6.11.1 Functional Description
This solution addresses Key Issue #1 on the support of eV2X Group Communication, Key Issue #9 on the support of the unicast/multicast communication over PC5 and Key Issue #4 on the support of PC5 QoS framework enhancement for eV2X, focusing on the following aspects:
  Identifiers for the unicast communication, e.g. L2 ID;
  Signalling protocol to support unicast/multicast communication;
  QoS support and AS layer configurations;
  Security associations;
  Procedures for the link establishment and maintenance.
6.11.2 Solution Description
6.11.2.1 Identifiers for the Unicast Communication
6.11.2.1.1 Separate L2 ID Address Space for Unicast and Multicast from Those for Broadcast One of the essential identifiers for the unicast/multicast communication is the L2 ID. As of the ProSe design in TS 23.303 [8], the destination L2 ID address space for one-to-one communication and one-to-many communications are separate with AS layer mechanism, i.e. MAC layer version number. This is done to avoid conflicts of the address used that may cause harm to one-to-one communications. In a similar manner, V2X unicast should also use the separate L2 IDs than that for the broadcast and multicast.

This separation applies to both destination L2 ID and source L2 ID. For a UE that has both broadcast and unicast/multicast traffic, different L2 IDs should be used with corresponding formats. The source L2 ID will be used by peer UE as the destination L2 ID in unicast communication. Details of the related L2 ID management for unicast/multicast is described in following clauses.

The UE may use distinct source L2 ID for different unicast one to one communication link e.g. when different unicast links are associated with different upper layer indentifiers.
6.11.2.1.2 Deciding the Destination L2 ID to Use for Unicast/Multicast Communication
6.11.2.1.2.1 Option A
  In TS 23.285 [5], the Destination L2 ID is decided by the UE based on a configured mapping between PSID/ITS-AID

---

Agreements on unicast

1: For AS-level information required to exchange among UEs via sidelink for SL unicast, RAN2 can consider the followings as a baseline and will check if the AS-level information can be agreed and the details after some progress in RAN2, SA2 and RAN1:
UE ID, UE capability, Radio/Bearer configuration, PHY information/configuration (e.g. HARQ, CSI), Resource information/configuration and QoS info
2: AS-level information for SL unicast can be exchanged between gNB and UE for RRC configuration. RAN2 assumes that a UE can provide network with QoS related information and will check if the AS-level information can be agreed and the details after some progress in RAN2, SA2 and RAN1.
3: AS-level information is exchanged via RRC signalling (e.g. PC5-RRC) among UEs via sidelink for SL unicast. New logical channel (SCCH: SL Control Channel) in addition to STCH (SL Traffic Channel) will be also introduced. SCCH carriers PC5-RRC messages.
4: RAN2 will consider both options during SI phase. Further discussion on the definition, procedure and information for each option is needed.
Option 1: AS layer connection establishment procedure by PC5-RRC is also needed.
Option 2: Upper layer connection establishment procedure is enough.
5: RAN2 will study a kind of RRM or RLM based AS level link management. RAN2 will not consider a kind of PC5-RRC level keep alive message based management. Further discussion on possible detailed options is needed.

to the L2 ID. This suites for broadcast traffic, but does not work for unicast or multicast traffic. In unicast or multicast, destination L2 ID would not be decided based on PSID/ITS-AID. A V2X UE should be allowed to have multiple unicast connections or multicast groups supported simultaneously for a particular service (PSID/ITS-AID). Therefore, the destination L2 ID information in this case should come from the upper layer. This means that the interface between the V2X layer and upper layer needs to be enhanced to allow such information to be passed down together with the data packet.

It is expected that the actual V2X applications do not understand the notion of L2 ID, as the applications can be built for cross technology or platforms. Therefore, some mid-ware layer within the UE has to translate the identifier used by the application layer, e.g. Station ID, to the V2X L2 ID. It means such mid-ware layer needs to maintain the mapping of application layer destination identifiers and L2 IDs. Since this mid-ware layer is out of scope of SA2, in the specification it can be noted as "upper layer" in general, and the assumption that this "upper layer" maintains the mapping and provides the L2 ID for unicast or multicast communication should be documented.

6.11.2.1.2.2 Option B

An alternative to the above solution is for the V2X layer to manage such unicast link/multicast group to L2 ID mapping. In that case, the unicast link/multicast group can be allocated with a flow identifier at the time of establishment. Corresponding connection profile information, e.g. L2 IDs, transmission settings, QoS parameters, etc., could be associated with it. In such a case, the upper layer only needs to use the flow identifier to indicate the destination and pass it down with the data packet. V2X layer will apply the associated profile information, including the L2 IDs, for the transmission. This would allow the reuse the Uu link handling mechanisms, e.g. similar to that of the QoS Flows, and be more extensible. Again, the translation of the application layer identifiers, e.g. Station ID, to this flow identifier has to be done by this mid-ware layer, i.e. the "upper layer".

6.11.2.2 Signalling Protocol to Support Unicast/Multicast Communication

For unicast or multicast communication, there is a need for some control message exchanged between the UEs involved in order to establish the link or group. Therefore, some signalling protocol is required.

In ProSe one-to-one communication defined in TS 23.303 [8], a PC5 Signalling Protocol (clause 5.1.1.5.2) was introduced, which runs over PDCP layer. Although it is defined for ProSe use, the messages could be extended in order to be used for V2X communication. The detailed protocol design needs to be reviewed based on the actual unicast operation procedures.

Another alternative approach is to run RRC over PC5. As PC5 Signalling Protocol is used over PDCP anyway, RRC protocol can be used to replace it. Although not all RRC features are required for PC5 operation, those selected V2X relevant RRC messages can be extended and used, e.g. SidelinkUEInformation, etc. The advantage of that is the potential unification of control signalling protocols for Uu and PC5.

Therefore, in this solution a signalling protocol over PC5 for the unicast/multicast communication management is introduced.

6.11.2.3 QoS Support and AS Layer Configurations

It is desirable that QoS can be support over the unicast and multicast communication as well.

In TS 23.285 [5], the QoS model for V2X communication is based on the per packet model, e.g. PPPP and PPPR. With unicast or multicast communication, it should be discussed whether a connection-oriented QoS model similar to that of Uu connection should be supported as well.

As also discussed in Key Issue #4 "Support of PC5 QoS framework enhancement for eV2X", something more than existing PPPP and PPPR is expected be required.

Specifically for unicast or multicast, due to the link or group involved, most packets sent over the same unicast link between a pair of peers should have the same QoS characteristics. This is closer to the Uu connection model, rather than the normal broadcast based traffic. Therefore, Uu type of QoS management concept can be reused here. This allow a unified model for Uu and PC5.

In addition, there could be different AS layer features that may be optional or not backward compatible. Therefore, when setting up the unicast link, such configuration could be also negotiated and configured together with/or as part of the QoS profile.

NOTE: The QoS Model for unicast described in Solution #19 (clause 6.19) is used.

6.11.2.4 Security Associations

The unicast or multicast communication may need protection at link layer as well. The ProSe one-to-one communication supports secure L2 link establishment, as defined in TS 33.303 [11].

However, within V2X communication context, each UE has the corresponding certificates for the security protection. Therefore, there may be a need to enhancement or adjust the existing L2 secure link establishment protocol in order to support the use of such security associations.

The exact security handling should be analysed and decided by SA3. SA2 design needs to be aligned with those decisions when available.

6.11.2.5 Procedures for the Link Establishment and Maintenance

TS 23.303 [8] has defined the procedures for the establishment and maintenance of secure L2 link over PC5, as in clause 5.4.5. These procedures can be enhanced and adapted for the V2X use, subject to the decisions above regarding signalling protocol choice, security handling, etc.

Some addition considerations for the V2X for the link/group handling is required though. For V2X communication, not all UEs will be supporting or use unicast communication. In addition, not all services may be run over the same channel or RAT (e.g. LTE V2X vs. NR V2X). With V2X, there is no discovery channel like that of ProSe (i.e. PC5-D), and there is no assumption on the configuration from network as that of Public Safety use. Therefore, in order to support the link establishment, there is a need for service announcement in order to inform the peer of the existence of the UE and the capability of the UE for the unicast communication, e.g. channel to operate, or the services supported, etc.

Such a service announcement should be made accessible to all the UEs that are interested in using the service. For example, such announcement could be either configured to send over a dedicate channel, similar to how WAVE Service Advertisement (WSA) is handled, or to be piggybacked on the periodical messages from the supporting UEs.

NOTE 1: Service announcement is handled by upper layer and out of scope of SA2.

For layer 2 link maintenance, keep-alive functionality is needed to detect that when the UEs are not in direct communication range, so that they can proceed with implicit layer 2 link release.

NOTE 2: It is left to Stage 3 to determine how keep-alive functionality is supported.

6.11.3 Procedures 6.11.3.1 Establishment of Layer 2 Link Over PC5

Layer-2 link establishment procedure as defined in TS 23.303 [8] clause 5.4.5.2 can be reused for the eV2X unicast link establishment, with the following adaptations:

The messages may be converted to RRC signaling message instead of PC5 signaling message, depends on RAN WG's decision.

"UE oriented layer 2 link establishment" operates as below and FIG. 5 (graphic 6.11.3.1-1 of 3GPP TR 23.786 V1.0.0) shows the procedure:

The Direct Communication Request message can be sent by UE-1 with broadcast mechanism, i.e. to a broadcast address associated with the application instead of the L2 ID of UE-2. The upper identifier of UE-2 is included in the Direct Communication Request message to allow UE-2 to decide on if to respond to the request. The Source L2 ID of this message should be the unicast L2 ID of the UE-1.

The Direct Communication Request message should be transmitted using default AS layer setting e.g. broadcast setting, that can be understood by UE-2.

UE-2 uses the source L2 ID of the received Direct Communication Request message as destination L2 ID in the subsequent signalling to UE-1, and uses its own unicast L2 ID as the source L2 ID. UE-1 obtains UE-2's L2 ID for future communication, for signalling and data traffic.

Figure 5:
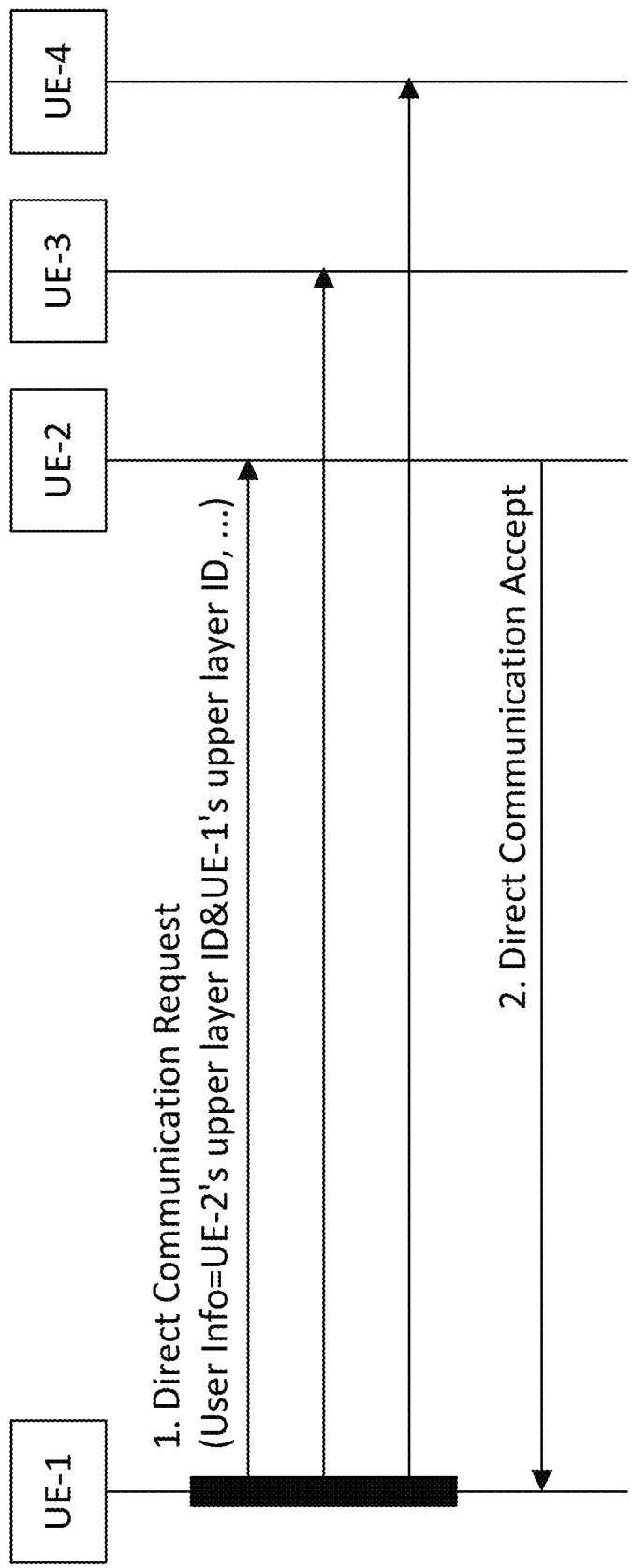
FIG. 5 is a reproduction of graphic 6.11.3.1-1 of 3GPP TR 23.786 V1.0.0.

FIG. 5 is a reproduction of graphic 6.11.3.1-1 of 3GPP TR 23.786 V1.0.0, Entitled "UE Oriented Layer 2 Link Establishment Procedure"

Figure 6:
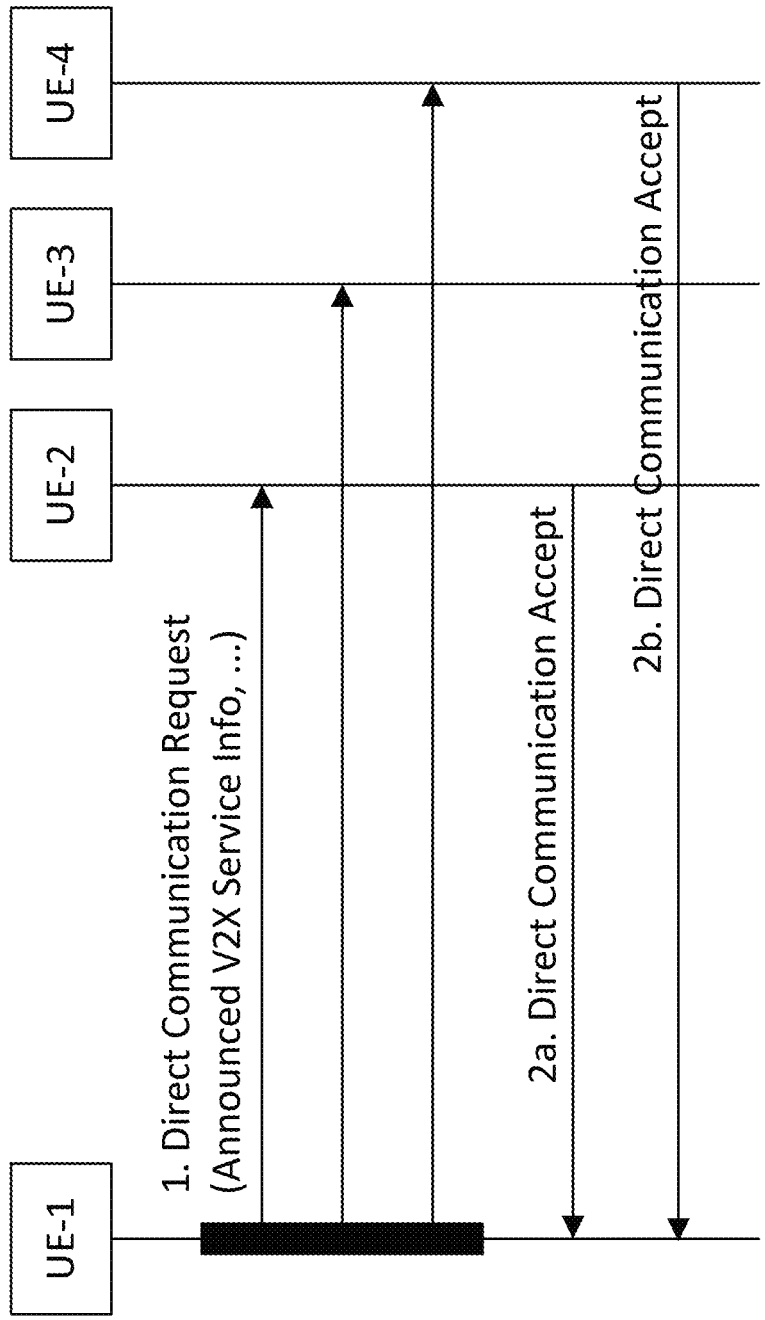
FIG. 6 is a reproduction of graphic 6.11.3.1-2 of 3GPP TR 23.786 V1.0.0.

"V2X Service oriented layer 2 link establishment" operates same to the "UE oriented layer 2 link establishment" with the following differences and FIG. 6 (graphic 6.11.3.1-2 of 3GPP TR 23.786 V1.0.0) shows the procedure:

The information about V2X Service requesting L2 link establishment, i.e. information about the announced V2X Service is included in the Direct Communication Request message to allow other UEs to decide on if to respond to the request.

The UEs that are interested in using the V2X Service announced by the Direct Communication Request message can respond to the request (UE-2 and UE-4 in FIG. 6 (graphic 6.11.3.1-2 of 3GPP TR 23.786 V1.0.0)).

After establishing layer 2 link with other UE(s) as described above, new UE(s) can enter proximity with UE-1, i.e. UE-1's direct communication range. In this case, UE-1 may initiate V2X Service oriented layer 2 link establishment procedure as it is aware of new UE(s) from Application Layer messages sent by the UE(s). Or the new UE may initiate V2X Service oriented layer 2 link establishment procedure. Therefore, UE-1 does not have to keep sending a Direct Communication Request message periodically to announce the V2X Service it wants to establish L2 link with other UE for unicast.

FIG. 6 is a reproduction of graphic 6.11.3.1-2 of 3GPP TR 23.786 V1.0.0, Entitled "V2X Service Oriented Layer 2 Link Establishment Procedure"

The layer 2 link supports the non-IP traffic. No IP address negotiation and allocation procedure would be carried out.

6.11.3.2 Contents of the Signalling Message for Link Establishment

The information carried in Direct Communication Request message defined in TS 24.334 [13] requires at least the following updates:

For "UE oriented layer 2 link establishment",

The User Info needs to include the target UE's ID (UE-2's upper layer ID), besides the initiating UE's ID (UE-Vs upper layer ID).

NOTE: Stage 3 can decide if these IDs can be carried in the same IE or separate IEs, for example, the Station ID/Vehicle Temp ID only needs to be 4 octets.

For "V2X Service oriented layer 2 link establishment",

The Announced V2X Service Info needs to include the information about V2X Service requesting L2 link establishment, e.g. PSID or ITS-AIDS of the V2X application. Sensor Sharing, and etc. can be the case for the V2X Service.

The IP Address Config, which is specified as mandatory for ProSe, should allow an indication that no IP is to be used, such that the receiving UE (e.g. UE-2) would not start any IP configuration procedure for this particular link.

The IEs dedicated for security need to be reviewed by SA3, as the security mechanism for eV2X may be different and requires different IEs.

Additional configuration information regarding the link, e.g. when RRC message is used there may be AS layer configurations.

Figure 7:
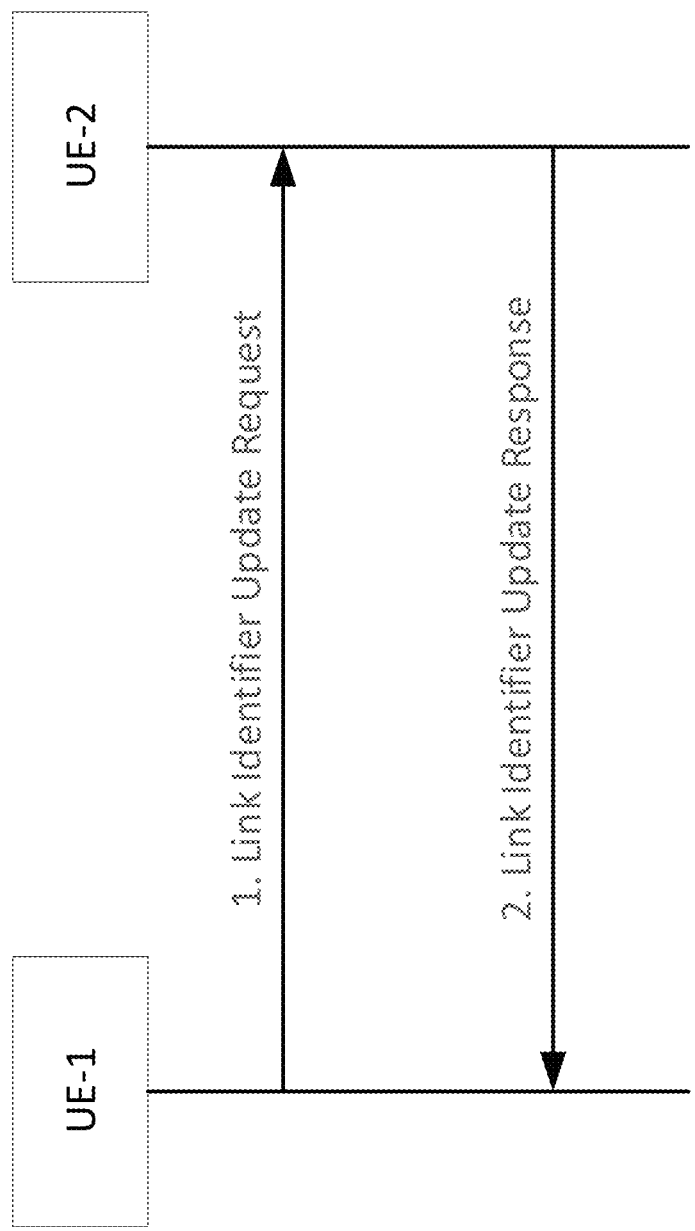
FIG. 7 is a reproduction of graphic 6.11.3.1-2 of 3GPP TR 23.786 V1.0.0.

6.11.3.3 Link Identifier Update Procedure for Privacy Protection of Unicast Communication FIG. 7 is a reproduction of graphic 6.11.3.3-1 of 3GPP TR 23.786 V1.0.0, Entitled "Layer-2 Link Identifier Update Procedure"

This procedure is used to update the peer in the unicast communication of the impending change of the identifiers used for this link. Due to the privacy requirements, in eV2X use, UE should frequently change its identifiers in order to avoiding being trackable by 3rd party. When the identifier change happens, all identifiers across all the layers, i.e. from application layer ID to L2 ID, need to be changed. This signaling is required before the identifier changes happen, to prevent service interruptions.

1. UE-1 decides the change of identifiers, e.g. due to the upper layer identifier change or a timer, and includes the new identifiers to use (including the new upper layer identifiers, new IP address/prefix if application, new L2 IDs) in the Link Identifier Update Request message, and send to UE-2 before it changes the identifiers. The new identifiers to use should be cyphered to protect privacy.

NOTE 1: The timer is running on a per Source L2 ID.

2. UE-2 respond with a Link Identifier Update Response message. Upon reception of the message, UE-1 and UE-2 can start to use the new identifiers for the data traffic. UE-1 shall receive traffic on its old L2 ID until it receives the Link Id Update Response from UE-2.

NOTE 2: If there are multiple links from UE-1 using the same upper layer identifiers or L2 IDs, UE-1 needs to perform the update procedure over each of the link and for each link needs to keep receiving traffic on its old L2 ID for that specific link until it receives the Link Id Update Response.

6.11.3.4 Security Aspects for Layer 2 Link

As the eV2X applications have associated security certificates, the unicast link can reuse those to derive the security association for protecting the signalling or data of the unicast link.

6.11.4 Impact on Existing Entities and Interfaces

Editor's note: Impacts on existing nodes or functionality will be added.

6.11.5 Topics for Further Study

None.

6.11.6 Conclusions

Solution documented in clauses 6.11.1 to 6.11.4 addressed all the aspects of Key Issue #9 Support of unicast/multicast for sensor sharing over PC5, and should move to normative phase. Following aspects will be further updated based on feedbacks from other Working Groups:

the signalling message definition for unicast link establishment and management, e.g. if and how RRC signalling is used for unicast link;

the choice of per packet QoS model or bearer based QoS model for broadcast, groupcast, and unicast based on RAN decisions;

signal to the base station regarding the service used when network scheduled mode is used;

the potential security related procedure updates for unicast communication over PC5.

NOTE: The application layer may use unicast or groupcast communication mechanism for different applications, e.g. platooning applications.

[ . . . ]

6.19 Solution #19: QoS Support for eV2X Communication Over PC5 Interface 6.19.1 Functional Description 6.19.1.1 General Description This solution addresses Key Issue #4 (clause 5.4) Support of PC5 QoS framework enhancement for eV2X. The QoS requirements for eV2X are different from that of the EPS V2X, and the previous defined PPPP/PPPR in TS 23.285 [5] are considered not to satisfy the needs. Specifically, there are much more QoS parameters to consider for the eV2X services. This solution proposes to use 5QI for eV2X communication over PC5 interface. This allows a unified QoS model for eV2X services over different links.

6.19.1.2 Solution Description

The new service requirements were captured in TS 22.186 [4]. The new performances KPIs were specified with the following parameters:

Payload (Bytes);
Transmission rate (Message/Sec);
Maximum end-to-end latency (ms);
Reliability (%);
Data rate (Mbps);
Minimum required communication range (meters).

Note that the same set of service requirements apply to both PC5 based V2X communication and Uu based V2X communication. As analysed in Solution #2 (clause 6.2), these QoS characteristics could be well represented with 5QI defined in TS 23.501 [7].

It is therefore possible to have a unified QoS model for PC5 and Uu, i.e. also use 5QIs for V2X communication over PC5, such that the application layer can have a consistent way of indicating QoS requirements regardless of the link used. This does not prevent the AS layer from implementing different mechanisms over PC5 and Uu to achieve the QoS requirements.

Considering the 5GS V2X capable UEs, there are three different types of traffic: broadcast, multicast, and unicast.

The UE-PC5-AMBR is applied to all types of traffic and is used for the RAN for capping the UE PC5 transmission in the resources management.

For unicast type of traffic, it is clear that the same QoS Model as that of Uu can be utilized, i.e. each of the unicast link could be treated as a bearer, and QoS flows could be associated with it. All the QoS characteristics defined in 5QI and the additional parameter of data rate could apply. In addition, the Minimum required communication range could be treated as an additional parameter specifically for PC5 use.

For broadcast traffic, there is no bearer concept. Therefore, each of the message may have different characteristics according to the application requirements. The 5QI should then be used in the similar manner as that of the PPPP/PPPR, i.e. to be tagged with each of the packet. 5QI is able to represent all the characteristics needed for the PC5 broadcast operation, e.g. latency, priority, reliability, etc. A group of V2X broadcast specific 5QIs (i.e. VQIs) could be defined for PC5 use.

NOTE 1: The 5QI used for PC5 may be different from that used for Uu even for the same V2X service, e.g. the PDB for the PC5 can be longer than that for the Uu as it is a direct link. The 5QIs used for PC5 is named VQI for differentiation.

NOTE 2: A mapping between the EPS V2X QoS parameters, e.g. PPPP and PPPR, with the new VQIs, e.g. similar to the non-GBR 5QIs defined in TS 23.501 [7], will be defined in normative phase for broadcast operation.

NOTE 3: The working assumption is that NR PC5 design support the use of V2X 5QIs.

NOTE 4: AS layer may handle unicast, groupcast and broadcast traffic by taking all their priorities, e.g. indicated by VQI, into account.

6.19.1.3 V2X 5QI (VQI) Values for PC5 Broadcast Use

A set of new VQIs for V2X use will be defined in normative phase reflecting the service requirements documented in TS 22.186 [4].

NOTE 1: The working assumption is that non-standardized VQI is not supported in this release.

NOTE 2: Whether per packet or per QoS flow QoS Model is used depends on RAN decision.

6.19.2 Procedures

Editor's note: This clause describes procedures to use the new QoS model for PC5 communication. It depends on RAN development as well.

6.19.2.1 QoS Support for Unicast Communication Over PC5 Interface 6.19.2.1.0 General To enable QoS support for eV2X one-to-one communication over PC5 interface, the followings procedures need to be supported.

Editor's note: The following procedures may be further updated depending on the progress on PC5 QoS Model.

6.19.2.1.1 QoS Parameters Provision to UE and NG-RAN

The PC5 QoS parameters and PC5 QoS rule are provisioned to the UE as part of service authorization parameters using the solution defined for Key Issue #5. The PC5 QoS rule is used to map the V2X services (e.g. PSID or ITS-AIDS of the V2X application) to the PC5 QoS flow.

The PC5 QoS parameters retrieved by the PCF from the UDR are provided to the NG-RAN via AMF. The AMF stores such information as part of the UE context. For subsequent procedures (e.g., Service request, Handover), the provision of the PC5 QoS parameters via N2 will follow the description as per clause 6.6.2.

NOTE 1: The UE-PC5-AMBR is provided by the UDM and the details will follow the description as per Solution #6.

The PC5 QoS parameters provisioning to the UE and NG-RAN could be triggered by the UE Policy container included in the NAS message provided by the UE. The PCF sends to the AMF the updated PC5 QoS parameters for NG-RAN when needed.

NOTE 2: The detailed PC5 QoS parameters used by NG-RAN will be identified during the normative work phase.

NOTE 3: NG-RAN is configured with static parameters for network scheduled resources allocation mode to support PC5 QoS.

6.19.2.1.2 QoS Parameters Negotiation Between UEs

The PC5 QoS parameters are negotiated at the establishment of one-to-one communication procedure, so the one-to-one communication establishment procedure defined in TS 23.303 [8] is enhanced to support PC5 QoS parameters negotiation between two UEs. After the PC5 QoS parameters negotiation procedure, the same QoS is used in both directions.

Figure 8:
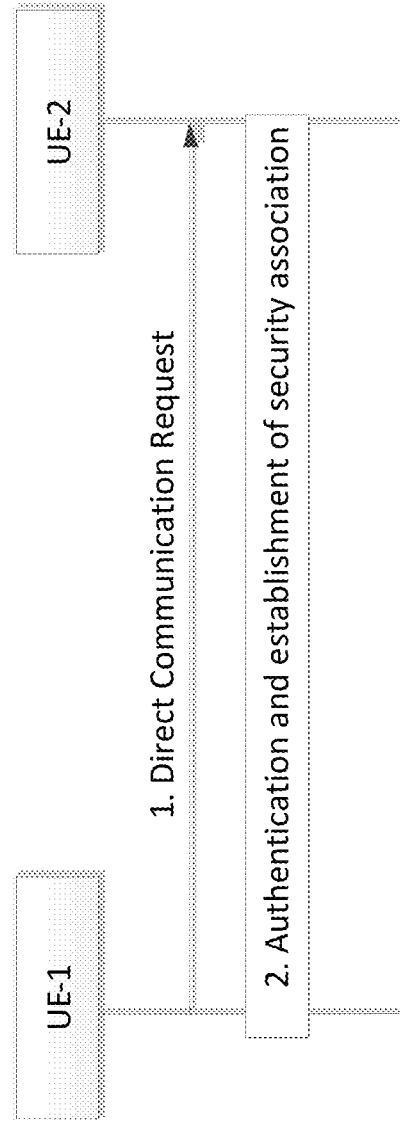
FIG. 8 is a reproduction of graphic 6.19.2.1.2-1 of 3GPP TR 23.786 V1.0.0.

FIG. 8 is a reproduction of graphic 6.19.2.1.2-1 of 3GPP TR 23.786 V1.0.0, entitled "Establishment of Secure Layer-2 Link Over PC5

UEs engaged in one to one communication negotiate PC5 QoS parameters during the link establishment procedure.

1. UE-1 sends a Direct Communication Request message to UE-2 in order to trigger mutual authentication. This message includes the requested PC5 QoS parameters.
2. UE-2 initiates the procedure for mutual authentication. The UE-2 includes the accepted PC5 QoS parameters in the Response message.

NOTE: This procedure is aligned with Solution #11 (clause 6.11).

6.19.2.1.3 QoS Handling for eV2X Communication

When PC5 unicast is used for the transmission of eV2X messages, the following principles are applied for both network scheduled operation mode and UE autonomous resources selection mode:

PC5 QoS parameters defined in clause 6.19.1.2 applies to the eV2X communication over PC5.

The eV2X message is sent on the PC5 QoS flow established using the procedure described in clause 6.19.2.1.2.

The mapping of application layer eV2X message to PC5 QoS parameters is based on the PC5 QoS rule.

When the network scheduled operation mode is used, following additional principles apply:

UE provides PC5 QoS parameter information to the gNB for resources request.

When the gNB receives a request for PC5 resource from a UE, the gNB can authorize the requested PC5 QoS parameter based on the PC5 QoS parameters received from AMF.

gNB can use the PC5 QoS parameter information for PC5 QoS handling.

When the autonomous resources selection mode is used, following additional principle applies:

The UE can use the PC5 QoS parameter for PC5 QoS handling based on the provisioned information described in clause 6.19.2.1.1.

6.19.2.2 QoS Support for Broadcast Communication Over PC5 Interface

When PC5 broadcast is used for the transmission of eV2X messages, the following principles are followed for both network scheduled operation mode and UE autonomous resources selection mode:

PC5 QoS parameters (e.g. VQI) defined in clause 6.19.1.2 applies to the eV2X communication over PC5.

The application layer sets the PC5 QoS parameters for each eV2X message when passing it to V2X layer for transmission.

When the network scheduled operation mode is used, following additional principles apply:

UE provides PC5 QoS information reflecting PC5 QoS parameters to the gNB for resources request.

gNB can use the PC5 QoS information reflecting PC5 QoS parameters for QoS handling.

When the autonomous resources selection mode is used, following additional principle applies:

The UE can use the PC5 QoS parameters for PC5 QoS handling.

NOTE: The choice of per packet QoS model or bearer based QoS model for broadcast is based on RAN decisions.

6.19.2.3 QoS Support for Group Communication Over PC5 Interface

The procedure on QoS support for group communication over PC5 interface is described in clause 6.21.2 (Solution #21).

6.19.3 Impact on Existing Entities and Interfaces

Following are the impacts to the UE and other NFs:

UE needs to support new QoS model for PC5 communication.

AMF provides NG-RAN with the QoS parameters for PC5 communication fetched from PCF in associating N2 messages for different procedures.

NG-RAN receives QoS parameters for PC5 communication from AMF and enforces QoS parameter for the network schedule mode.

UDR stores QoS parameters for PC5 communication.

Editor's note: It is FFS if mapping of PPPP, PPPR to the new VQI would be necessary for broadcast traffic.

6.19.4 Topics for Further Study

Editor's note: This clause describes topics for further study.

6.19.5 Conclusions

The solution captured in clauses 6.19.1 to 6.19.3 should move to normative phase.

3GPP R2-1900370 includes the following discussion:

In some contributions [11][12][13], it was pointed out that there might be the need for the receiver UE to be informed of some receiver-side relevant parameters corresponding to the SLRB(s) configured at the transmitter UE side, so as for the receiver to get aligned with the transmitter and correctly receive the data sent from corresponding SLRB(s). Such receiver-side related SLRB configurations may include sequence number space and RLC modes if they are configurable [13], and the reason is easy to understand: if these parameters are configurable, when a UE receives the data corresponding to an LCID, the UE has to be informed of the specific values set for these parameters by the transmitter on the corresponding SL LCH (and corresponding SLRB), in order to process the reception of the data correctly.

However, there were also some other reasonable views which indicate that similar to UE reception in DL there may be no QoS enforcement operation needed at the receiver in SL [11], or which treated such enforcement of receiver-side SLRB configurations by the transmitter as some forms of optimization [12]

In the following, therefore, it is worth discussing whether such receiver-side related SLRB configuration(s) informed to the receiver UE by the transmitter UE in NR SL is needed or not. Also, in LTE SL these receiver-side SLRB configurations are specified in STCH configuration in TS 36.331 [17, 9.1.1.6]), so that they do not need to be informed by the transmitter.

Question 5: Does the transmitter UE need to inform the receiver UE of any receiver-side related SLRB configurations in NR SL (so as to align transmitter and receiver on these configurations)? If yes, what are they?
a) Yes, the SN length used for reception of an SLRB needs to be informed (if configurable).
b) Yes, the RLC mode used for an SLRB needs to be informed (if configurable).
c) No. No such receiver-side SLRB configuration informed by the transmitter in NR SL is needed; they are specified configuration in the spec as in LTE SL.
d) Others. If selected, please clarify what other options are.
e) Yes, the PC5 QoS profile associated with each SLRB/SL LCH established at the transmitter UE needs to be informed to the receiver UE.
f) Yes, SLRB-specific PHY configuration needs to be informed (e.g. HARQ/SFCI configuration)
g) Yes, receiver-side SLRB configuration configured by transmitter UE (e.g. t-Reordering, t-Reassembly, etc)

The appendix in 3GPP R2-1900370 described several candidate options for NW configured/pre-configured SLRB as follows:

Appendix: Candidate Options for NW Configured/Pre-Configured SLRB

As per experience from LTE SL, UEs with different RRC states/resource allocation modes may depend on different ways of signaling and procedures for their SL (pre-)configuration (i.e. dedicated signaling, system information and pre-configuration). Therefore, options with different signaling flows are given below.

Option 1

Figure 9:
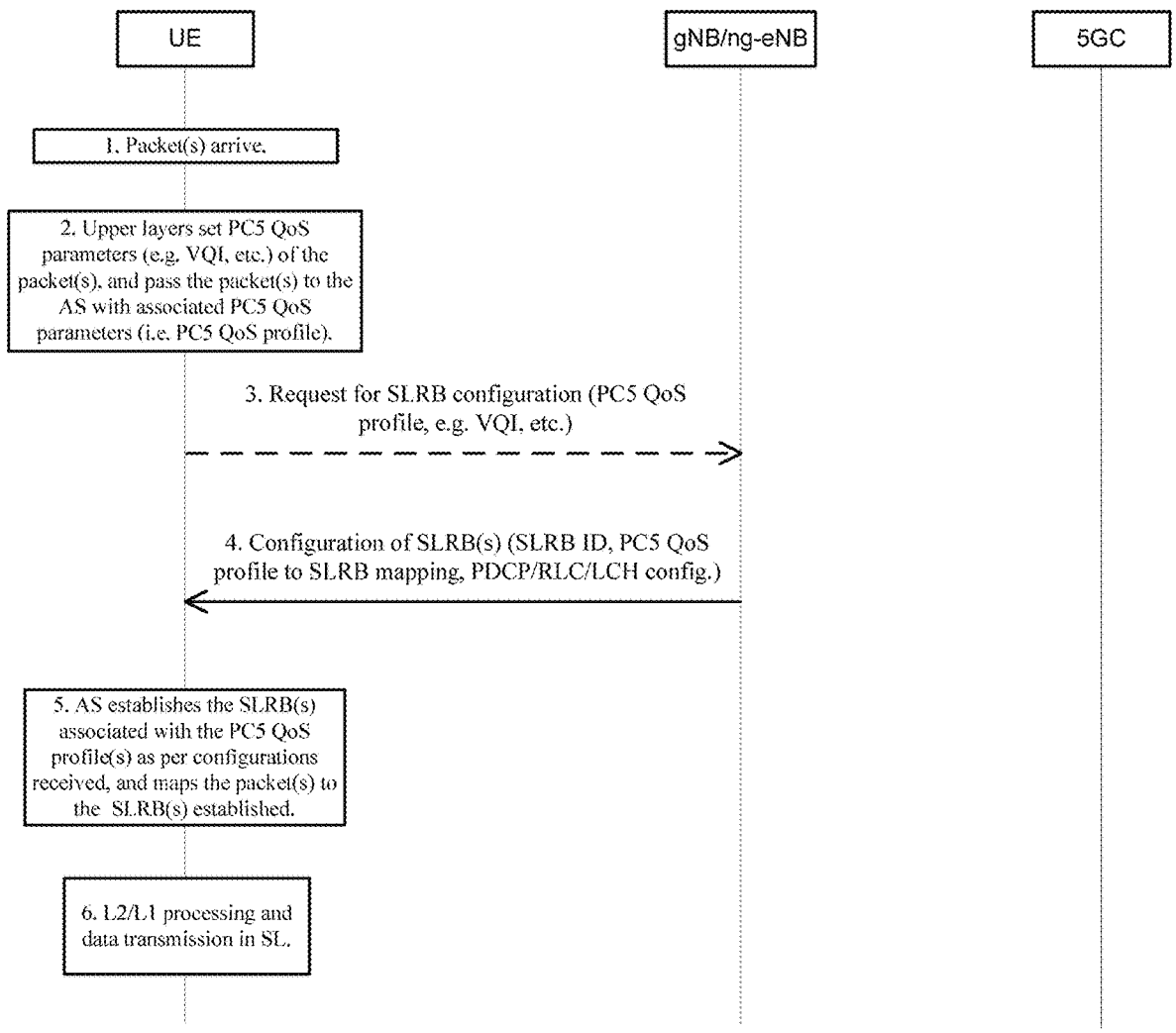
FIG. 9 is a reproduction of graphic A-1 of 3GPP R2-1900370.

FIG. 9 is a reproduction of graphic A-1 of 3GPP R2-1900370, Entitled "PC5 QoS Profile Based, UE Specific Configuration"

Since SA2 concluded to define VQI to represent the per-packet PC5 QoS parameters in TR 23.786 and indicates that the VQI of each V2X message (whenever applicable) is set by application layer [1], this option is based on such conclusions and further assumes that the PC5 QoS parameters (e.g. VQI, etc.[1]), namely PC5 QoS profiles[2] tagged on each V2X packet is also submitted to the AS (similar to legacy PPPP/PPPR) as in Step 2 above. In Step 3, the UE may report the PC5 QoS profiles of the packet(s) to the gNB/ng-eNB, and requests the configuration of the SLRB(s) associated with these PC5 QoS profile(s) reported. As a response, the gNB/ng-eNB may signal the configurations of the SLRB(s) associated with the PC5 QoS profile(s) reported; these SLRB configurations may include SLRB ID, PC5 QoS profile to SLRB mapping, SDAP/PDCP/RLC/LCH configurations, etc. In Step 5, the UE in the AS establishes SLRB(s) associated with the QoS profile of the packet(s) as per gNB/nb-eNB configuration, and maps the packet(s) to the SLRB(s) established. Afterward, SL transmission happens.

[1] Here, the specific PC5 QoS parameters in the figure include VQI and other potential QoS parameters identified by Q2, so that the "etc." placed here might be updated as per Q2 conclusion later (if the option itself is finally supported). This applies also to Option 3 & 4 below

[2] Similar to Uu, the term "PC5 QoS profile" here means a set of PC5 QoS parameters, i.e. VQI and other potential QoS parameters from Q2.

Since SA2 assume that "non-standardized VQI is not supported in this release" in TR 23.786 [1], it is quite likely that, similar to 5QI used in NR Uu, the PC5 QoS parameters of each VQI are also standardized in the specification. Also, if VQI itself is regarded as not sufficient to reflect all PC5 QoS parameters in Q2, other necessary QoS parameters will be used together with VQI to form the PC5 QoS profile and reported to the RAN as well. Therefore, this option is characterized by enabling the UE to directly "tell" the QoS parameters of available packets in RAN to the gNB/ng-eNB which thus no longer needs to rely on CN to get aware of the QoS profiles of the UE's traffic as in Uu.

Applicability: In this option, the gNB/ng-eNB configures SLRB depending on the PC5 QoS parameters of the actually packets available as reported by the UE, so it works in a UE-specific manner and is applied to RRC_CONNECTED UEs.

Option 2

Figure 10:
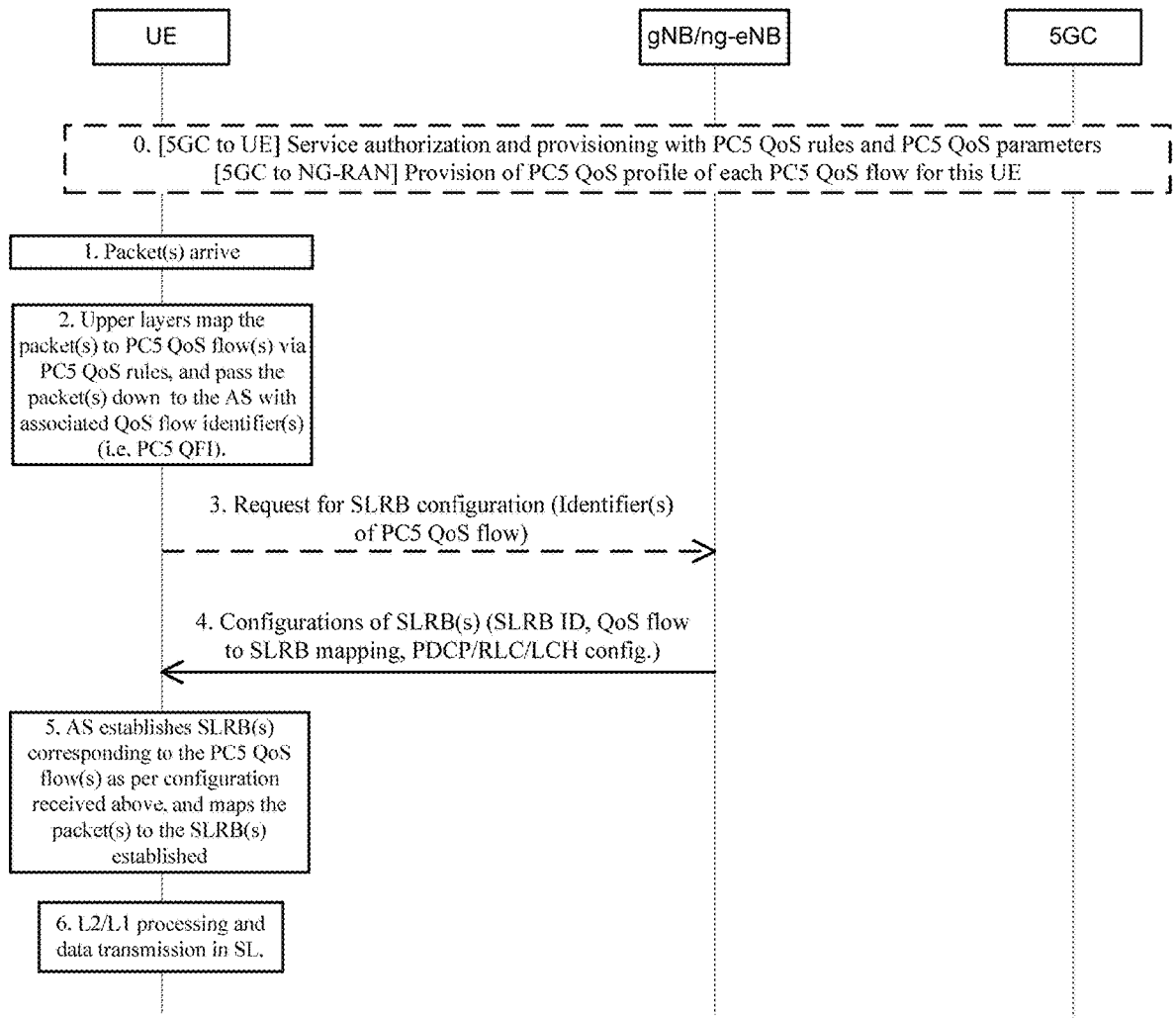
FIG. 10 is a reproduction of graphic A-2 of 3GPP R2-1900370.

FIG. 10 is a reproduction of graphic A-2 of 3GPP R2-1900370, Entitled "PC5 QoS Flow Based, UE Specific Configuration"

Option 2, as shown in FIG. 10 (graphic A-2 of 3GPP R2-1900370), is to imitate the QoS flow based mechanism in NR Uu, because, as per Solution #19 in TR 23.786 [1], SA2 is also proposing, at least for QoS support SL unicast, to use the PC5 QoS flow based mechanism as follows [1]:

---
6.19.2.1.1 QoS parameters provision to UE and NG-RAN
---
The PC5 QoS parameters and PC5 QoS rule are provisioned to the UE as part of service authorization parameters using the solution defined for Key Issue #5. The PC5 QoS rule is used to map the V2X services (e.g. PSID or ITS-AIDs of the V2X application) to the PC5 QoS flow. The PC5 QoS parameters are provisioned to the NG-RAN as part of The PC5 QoS parameters retrieved by the PCF from the UDR are provided to the NG-RAN via AMF. The AMF stores such information as part of the UE context. For subsequent procedures (e.g., Service request, Handover), the provision of the PC5 QoS parameters via N2 will follow the description as per clause 6.6.2.

---

Particularly, in Step 0 the PC5 QoS parameters and PC5 QoS rules for each PC5 QoS flow are provisioned to the UE in advance by service authorization and provisioning procedure as above SA2 conclusions; similarly, PC5 QoS profiles for each QoS flows are also given to the eNB/ng-eNB in advance in a provisioning way. Then, when packet(s) arrive, the UE can first derive the identifier of the associated PC5 QoS flow(s) based on the PC5 QoS rules configured in Step 0, and may then report these PC5 QFI(s) to the gNB/ng-eNB in Step 3. At the gNB/ng-eNB side, it can derive the QoS profile(s) of these reported PC5 QFI(s) based on the provisioning from 5GC in Step 0, and thus may signal the configurations of the SLRB(s) associated with the PC5

QFI(s) UE reported. In Step 5, the UE in the AS establishes SLRB(s) associated with the PC5 QFI(s) of the packet(s) as per gNB/ng-eNB configuration, and maps available packet(s) to the SLRB(s) established.

The biggest difference from Option 1 is that, with only QFI used as in NR Uu, the specific QoS parameters of each QoS flow may not be directly visible in the AS of the UE/RAN, so that the gNB/ng-eNB still needs to depend on the configuration from CN to know the specific QoS profile as in Uu (though the QoS profiles are provided in a provisioning way in advance)

Applicability: This option, similar to Option 1, is only applicable to RRC_CONNECTED UEs.

Option 3

Figure 11:
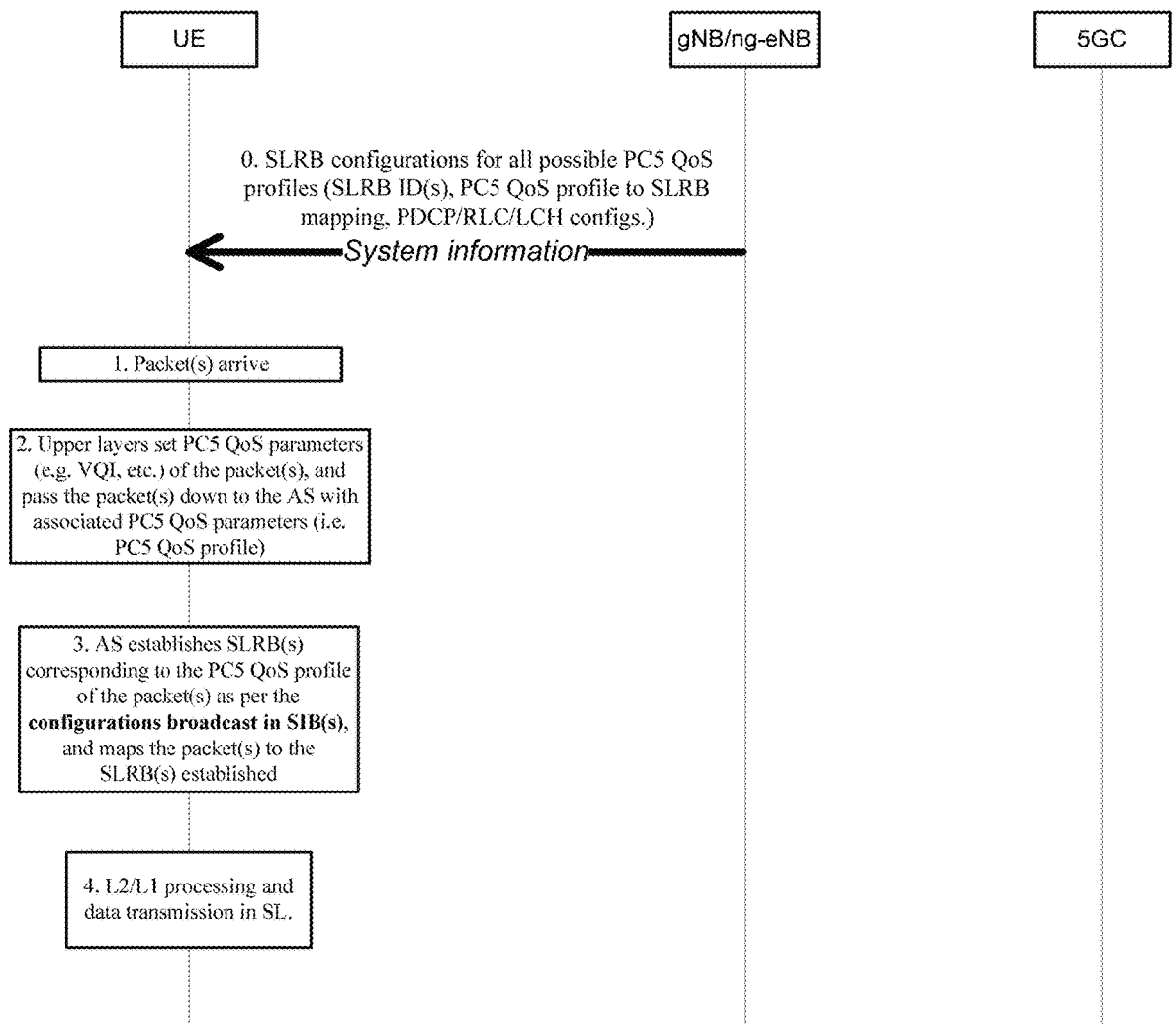
FIG. 11 is a reproduction of graphic A-3 of 3GPP R2-1900370.

FIG. 11 is a reproduction of graphic A-3 of 3GPP R2-1900370, Entitled "PC5 QoS Profile Based, Cell Specific Configuration (e.g. in V2X Specific SIB)"

Option 3 is applied when one wants to apply NW-configured SLRB for RRC_IDLE/RRC_INACTIVE UEs as well. Specifically, in this option, the gNB/ng-eNB uses V2X specific SIB to broadcast the SLRB configuration associated with each possible PC5 QoS profiles. Then, when packet(s) with specific PC5 QoS profile(s) arrive as in Step 1 and 2, the UE then establishes the SLRB(s) corresponding to these QoS profile(s) as per the cell-specific configurations broadcast in the SIB and maps the packet(s) to the SLRB(s) established.

Applicability: This option just turns the UE specific SLRB configurations, into cell-specific configurations. Though it is mainly designed for RRC_IDLE/RRC_INACTIVE UEs, it is technically usable for RRC_CONNECTED UEs as well.

3GPP TS 36.300 introduced the mapping between sidelink radio bearers and sidelink logical channels as follows:

6 Layer 2

Layer 2 is split into the following sublayers: Medium Access Control (MAC), Radio Link Control (RLC) and Packet Data Convergence Protocol (PDCP).

This subclause gives a high level description of the Layer 2 sub-layers in terms of services and functions. The three figures below depict the PDCP/RLC/MAC architecture for downlink, uplink and Sidelink, where:

- Service Access Points (SAP) for peer-to-peer communication are marked with circles at the interface between sublayers. The SAP between the physical layer and the MAC sublayer provides the transport channels. The SAPs between the MAC sublayer and the RLC sublayer provide the logical channels.
- The multiplexing of several logical channels (i.e. radio bearers) on the same transport channel (i.e. transport block) is performed by the MAC sublayer;
- In both uplink and downlink, when neither CA nor DC are configured, only one transport block is generated per TTI in the absence of spatial multiplexing;
- In Sidelink, only one transport block is generated per TTI.

[ . . . ]

Figure 12:
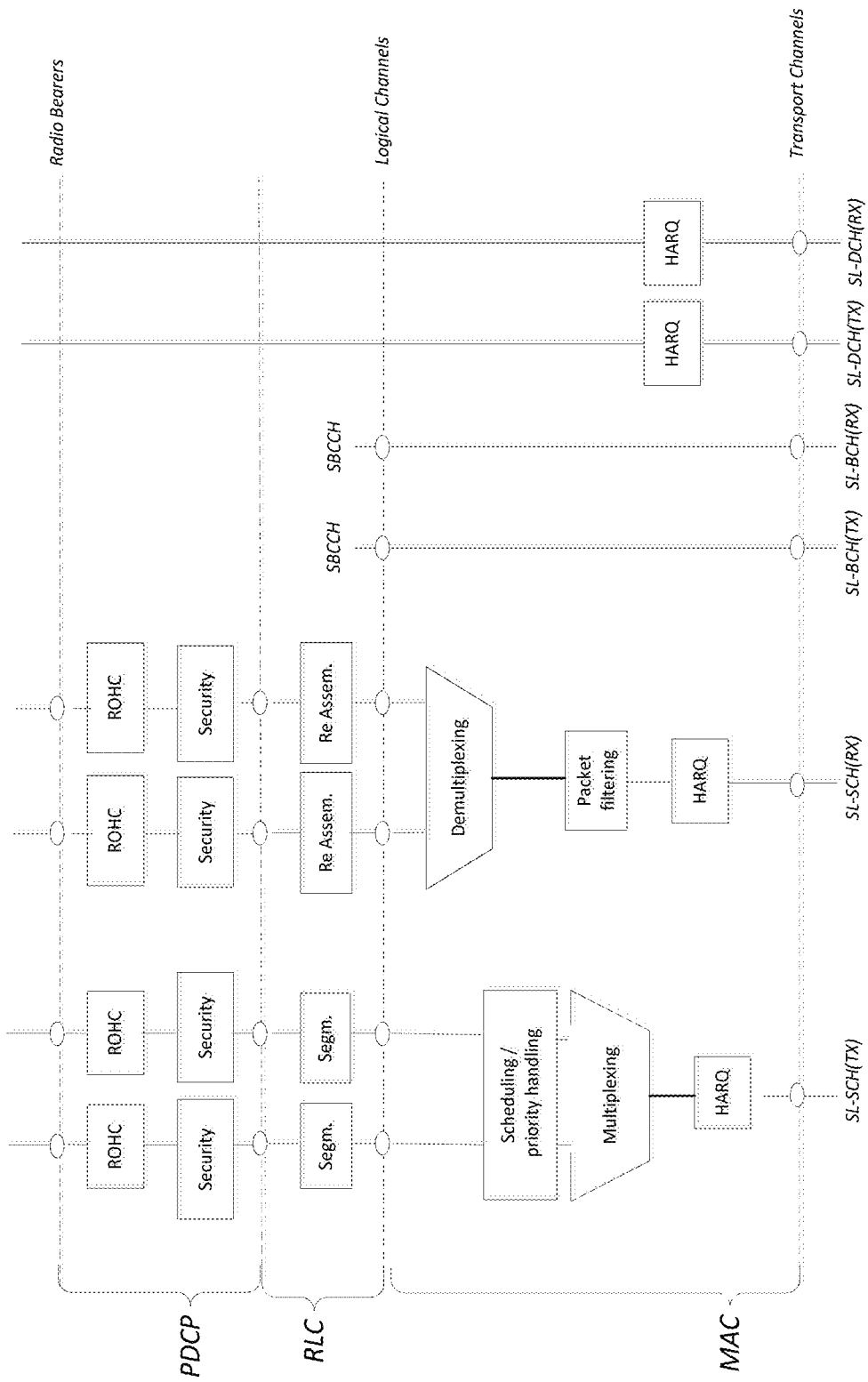
FIG. 12 is a reproduction of graphic 6-3 of 3GPP TS 36.300 V15.3.0.

FIG. 12 is a reproduction of graphic 6-3 of 3GPP TS 36.300 V15.3.0, Entitled "Layer 2 Structure for Sidelink"

3GPP TS 36.331 states:

5.10.2 Sidelink UE Information 5.10.2.1 General

Figure 13:
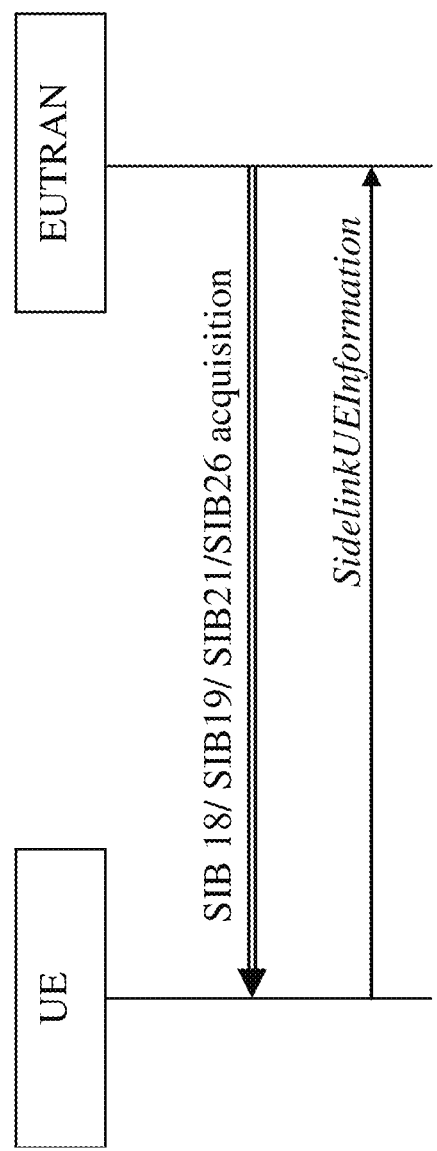
FIG. 13 is a reproduction of graphic 5.10.2-1 of 3GPP 36.331 V15.3.0.

FIG. 13 is a reproduction of graphic 5.10.2-1 of 3GPP 36.331 V15.3.0, Entitled "Sidelink UE Information"

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.2 Initiation

A UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

NOTE 1: A UE in RRC_IDLE that is configured to transmit sidelink communication/V2X sidelink communication/sidelink discovery announcements, while SystemInformationBlockType18/SystemInformationBlockType19/SystemInformationBlockType21 including sl-V2X-ConfigCommon or SystemInformationBlockType26 does not include the resources for transmission (in normal conditions), initiates connection establishment in accordance with 5.3.3.1a.

Upon initiating the procedure, the UE shall:

[ . . . ]

1> if SystemInformationBlockType21 including sl-V2X-ConfigCommon is broadcast by the PCell:
  2> ensure having a valid version of SystemInformationBlockType21 and SystemInformationBlockType26, if broadcast, for the PCell;
  2> if configured by upper layers to receive V2X sidelink communication on a primary frequency or on one or more frequencies included in v2x-InterFreqInfoList, if included in SystemInformationBlockType21 or SystemInformationBlockType26 of the PCell:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType21 including sl-V2X-ConfigCommon; or
    3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:

4> initiate transmission of the SidelinkUEInformation message to indicate the V2X sidelink communication reception frequency(ies) of interest in accordance with 5.10.2.3;
2> else:
    3> if the last transmission of the SidelinkUEInformation message included v2x-CommRxInterestedFreqList:
        4> initiate transmission of the SidelinkUEInformation message to indicate it is no longer interested in V2X sidelink communication reception in accordance with 5.10.2.3;
2> if configured by upper layers to transmit V2X sidelink communication on a primary frequency or on one or more frequencies included in v2x-InterFreqInfoList, if included in SystemInformationBlockType21 or SystemInformationBlockType26 of the PCell:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType21 including sl-V2X-ConfigCommon; or
    3> if the last transmission of the SidelinkUEInformation message did not include v2x-CommTxResourceReq; or if the information carried by the v2x-CommTxResourceReq has changed since the last transmission of the SidelinkUEInformation message:
        4> initiate transmission of the SidelinkUEInformation message to indicate the V2X sidelink communication transmission resources required by the UE in accordance with 5.10.2.3;
    2> else:
        3> if the last transmission of the SidelinkUEInformation message included v2x-CommTxResourceReq:
            4> initiate transmission of the SidelinkUEInformation message to indicate it no longer requires V2X sidelink communication transmission resources in accordance with 5.10.2.3;
        SidelinkUEInformation The SidelinkUEInformation message is used for the indication of sidelink information to the eNB.

Signalling radio bearer: SRB1
RLC-SAP: AM
Logical channel: DCCH
Direction: UE to E-UTRAN

| SidelinkUEInformation message |
|---|
| -- ASN1START<br>...<br>SidelinkUEInformation-v1430-IEs ::= SEQUENCE {<br>    v2x-CommRxInterestedFreqList-r14    SL-V2X-CommFreqList-r14    OPTIONAL,<br>    p2x-CommTxType-r14    ENUMERATED {true}    OPTIONAL,<br>    v2x-CommTxResourceReq-r14    SL-V2X-CommTxFreqList-r14    OPTIONAL,<br>    nonCriticalExtension    SidelinkUEInformation-v1530-IEs<br>    OPTIONAL<br>}<br>SidelinkUEInformation-v1530-IEs ::= SEQUENCE {<br>    reliabilityInfoListSL-r15    SL-ReliabilityList-r15    OPTIONAL,<br>    nonCriticalExtension    SEQUENCE { }    OPTIONAL<br>}<br>...<br>SL-V2X-CommFreqList-r14 ::= SEQUENCE (SIZE (1..maxFreqV2X-r14)) OF INTEGER (0..maxFreqV2X-1-r14)<br>SL-V2X-CommTxFreqList-r14 ::=    SEQUENCE (SIZE (1..maxFreqV2X-r14)) OF SL-V2X-CommTxResourceReq-r14<br>SL-V2X-CommTxResourceReq-r14 ::=    SEQUENCE {<br>    carrierFreqCommTx-r14    INTEGER (0.. maxFreqV2X-1-r14)    OPTIONAL,<br>    v2x-TypeTxSync-r14    SL-TypeTxSync-r14    OPTIONAL,<br>    v2x-DestinationInfoList-r14    SL-DestinationInfoList-r12    OPTIONAL<br>}<br>-- ASN1STOP |

| SidelinkUEInformation field descriptions |
|---|
| carrierFreqCommTx |
| Indicates the index of the frequency on which the UE is interested to transmit V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency. |
| commRxInterestedFreq |
| Indicates the frequency on which the UE is interested to receive sidelink communication. |
| commTxResourceReq |
| Indicates the frequency on which the UE is interested to transmit non-relay related sidelink communication as well as the one-to-many sidelink communication transmission destination(s) for which the UE requests E-UTRAN to assign dedicated resources. NOTE 1. |

| SidelinkUEInformation field descriptions |
| --- |
| reliabilityInfoListSL |
| Indicates the reliability(ies) (i.e., PPPRs [9]) associated with the reported traffic to be transmitted for V2X sidelink communication.<br>v2x-CommRxInterestedFreqList |
| Indicates the index(es) of the frequency(ies) on which the UE is interested to receive V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency.<br>v2x-DestinationInfoList |
| Indicates the destination(s) for V2X sidelink communication.<br>carrierFreqCommTx |
| Indicates the index of the frequency on which the UE is interested to transmit V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency.<br>v2x-TypeTxSync |
| Indicates the synchronization reference used by the UE. |

Figure 14:
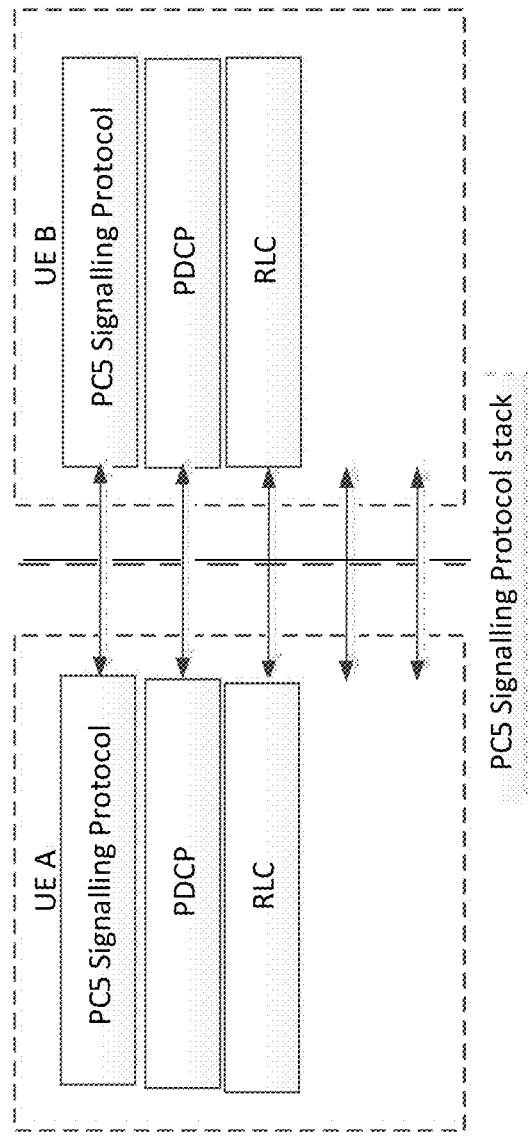
FIG. 14 is a reproduction of graphic 5.1.1.5.3-1 of 3GPP TS 23.303 V15.1.0.

3GPP TS 23.303 states:
5.1.1.5.2 PC5 Signalling Protocol
Legend:
  The PDCP/RLC/MAC/PHY functionality is specified in TS 36.300 [17].
  PC5 Signalling Protocol" is used for control plane signalling over PC5 (e.g. establishment, maintenance and release of secure layer-2 link over PC5, TMGI monitoring requests, Cell ID announcement requests etc. as described elsewhere in this specification).
  The SDU Type field (3 bits) in the PDCP header is used to discriminate between IP, ARP and PC5 Signalling Protocol. ARP is not supported for one-to-one communication.
  PC5 Signalling Protocol messages are sent on a unicast Destination Layer-2 ID.
FIG. 14 is a reproduction of graphic 5.1.1.5.3-1 of 3GPP TS 23.303 V15.1.0, Entitled "PC5 Signalling Protocol Stack"
3GPP R2-1904707 states:
  For SL unicast, between the same UE pair, it is allowed to establish multiple links using same or different source IDs.

| SA2 TS 23.287: |
| --- |
| 5.6.1.4 Identifiers for unicast mode V2X communication over PC5 reference point<br>A UE may establish multiple unicast links with a peer UE and use the same or different source<br>Layer-2 IDs for these unicast links.<br>Editor's note: Further updates of the identifier description may be required based on RAN WG feedback. |

The purpose of such design is to keep certain flexibility for upper layer link management. However, we foresee some critical impacts to link management at access stratum. For instance, it is not clear that whether the peer UE can understand if different source IDs are referring to the same transmitter UE. Thus, it will be problematic for a UE to know if the UE capability received via one link can be applied to other links as well. Besides, having link management at access stratum, e.g. RLM/RLF, for all links between the same UE pair seems to be unnecessary.

As for L1 ID, between the same UE pair for different links with different source L2 IDs the corresponding L1 IDs can also be different. However, in our view, this is not necessary and may cause issues for other procedures e.g. CSI report. First of all, from packet filtering perspective, the receiver UE will decode all packets from the peer UE even if those packets belong to different links. Secondly, among different links between the same UE pair, the channel condition is always the same. Therefore, it makes no sense to acquire CSI report for different links deduced from different source/destination L1 ID pairs between the same UE pair.

Observation 4 For SL unicast, a UE may establish multiple unicast links with a peer UE and use the same or different source Layer-2 IDs for these unicast links. Impacts to access stratum design are foreseen with respect to UE capability exchange, RLM/RLF procedure, and CSI report.

Proposal 5 RAN2 investigates the impacts of allowing one UE to use multiple L2 source IDs for communication with the same peer UE. If needed, RAN2 sends LS to SA2 to clarify and feedback RAN2's view.

3GPP R2-1904094 states:
2.1 Preliminaries for RB Modelling in NR Uu and in LTE SL
  In NR Uu, the radio bearer configured with RLC AM is a bi-directional bearer, which include one PDCP entity, one RLC entity and one logical channel[3]. The RLC entity consists of a transmitting side and a receiving side. The RLC data PDU and the RLC status report (SR) are transmitted and received via the same RLC entity and the same logical channel (i.e. with same LCID). The modelling of such bi-directional radio bearer is illustrated in FIG. 15 (graphic 1 of 3GPP R2-1904094).

Figure 15:
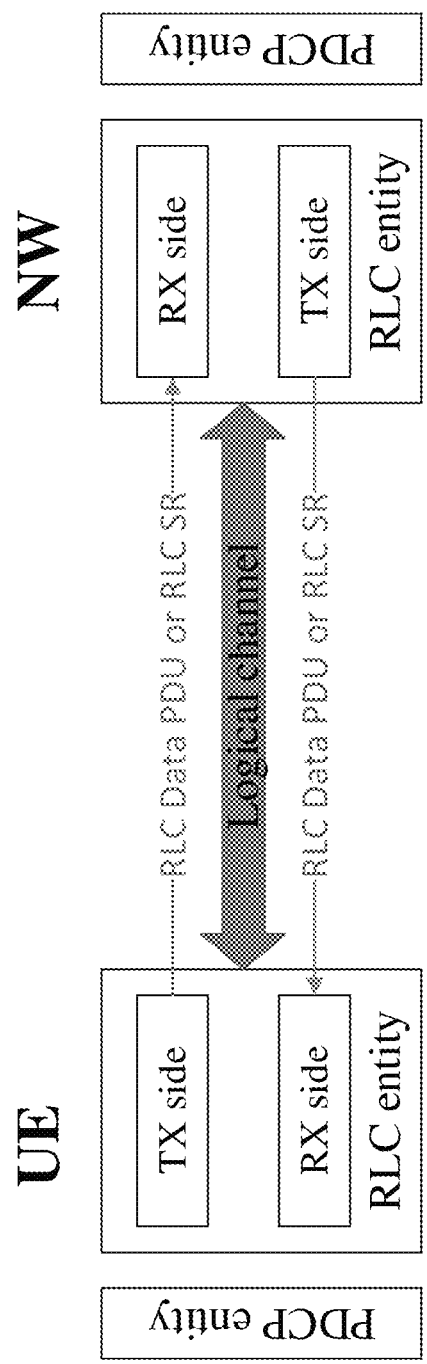
FIG. 15 is a reproduction of graphic 1 of 3GPP R2-1904094.

[3] For simplicity, the PDCP duplication case is not considered throughout this paper FIG. 15 is a reproduction of graphic 1 of 3GPP R2-1904094, Entitled "Bi-Directional Uu RB with RLC AM"

In LTE SL, only RLC UM is supported for the SLRB. The LCID of each SLRB is unique within the scope of one Source Layer-2 ID (SRC L2 ID) and Destination Layer-2 ID (DST L2 ID) combination, no matter for unicast and groupcast in D2D communication or for broadcast in V2X SL communication. So it can be understood that each SL radio bearer is identified by the combination of {LCID, SRC L2 ID, DST L2 ID} of its associated SL LCH. This means that, within a UE, any SLRB used for Tx and that used for Rx in a unicast link can never be the same, because the former is identified by the {SRC L2 ID, DST L2 ID}={UE ID of the UE's own, UE ID of the peer} but the latter is identified by {SRC L2 ID, DST L2 ID}={UE ID of the peer, UE ID of the UE's own} (i.e. in different order). For example, with respect to UE1 in FIG. 16 (graphic 2 of 3GPP R2-1904094), the SLRB used for Tx to UE2 is identified by {UE1 ID, UE2 ID}, whereas the SLRB used for Rx from UE2 is identified by {UE2 ID, UE1 ID}. This means that an SL radio bearer, along with its associated PDCP/RLC entity and SL LCH in LTE SL unicast is uni-directional, either used for transmission only or reception only. The modelling of such uni-directional bearer is illustrated in the FIG. 16 (graphic 2 of 3GPP R2-1904094).

Such uni-directional modelling is feasible in LTE SL, with one important reason that only RLC UM is applied for STCH, so that an RLC entity needs to be used only for transmission or reception without the need to performing both.

Figure 16:
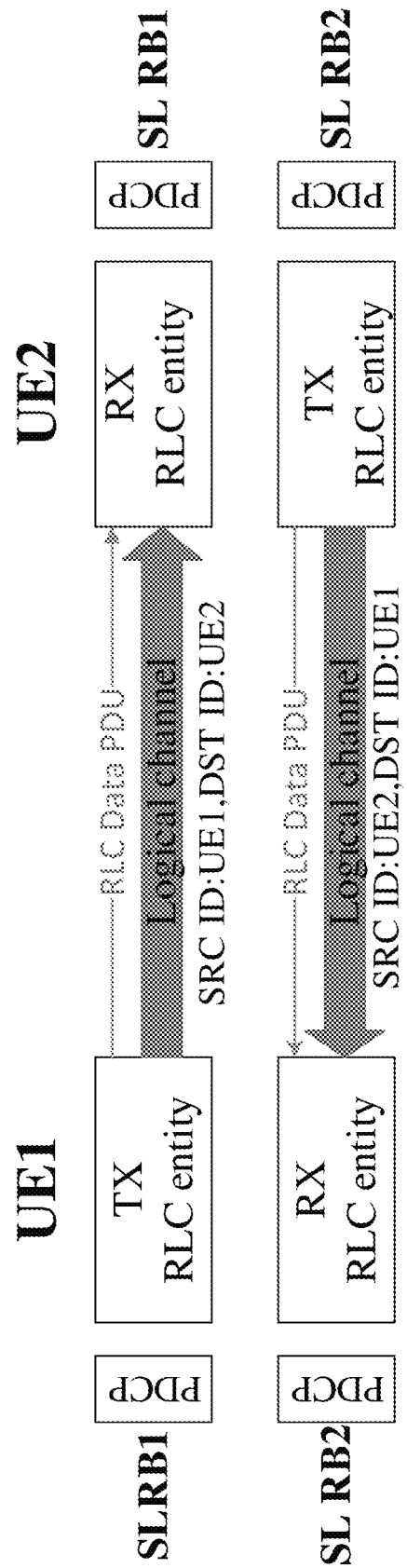
FIG. 16 is a reproduction of graphic 2 of 3GPP R2-1904094.

FIG. 16 is a reproduction of graphic 2 of 3GPP R2-1904094, Entitled "Uni-Directional SL RB with RLC UM"

2.2 Bi-Directional vs. Uni-Directional SLRB for RLC AM in SL

To support RLC AM for NR SLRB (including SL DRB for UP data and SL SRB for PC5 RRC) in NR unicast, the first issue needs to be discussed is whether the SLRB with RLC AM should be modelled as uni-directional bearer or bi-directional bearer. This functions as the essence for all other detailed stage-3 designs subsequently.

Option 1: Uni-directional SLRB for RLC AM

This option is trying to reuse as much as possible the modelling of uni-directional SLRB with RLC UM in LTE SL, which is also the only RLC mode agreed to be supported for NR SL groupcast and broadcast. To be specific, each SL RB includes one PDCP entity, one uni-directional RLC entity and one SL logical channel. Moreover, the principle of LTE SL that the LCID of the logical channel is unique within one Source Layer-2 ID/Destination Layer-2 ID combination is still kept, meaning that the SLRB/SL LCH/PDCP entity/ RLC entity used for Tx and those for Rx are still distinguished by the associated{SRC L2 ID, DST L2 ID} pair.

Figure 17:
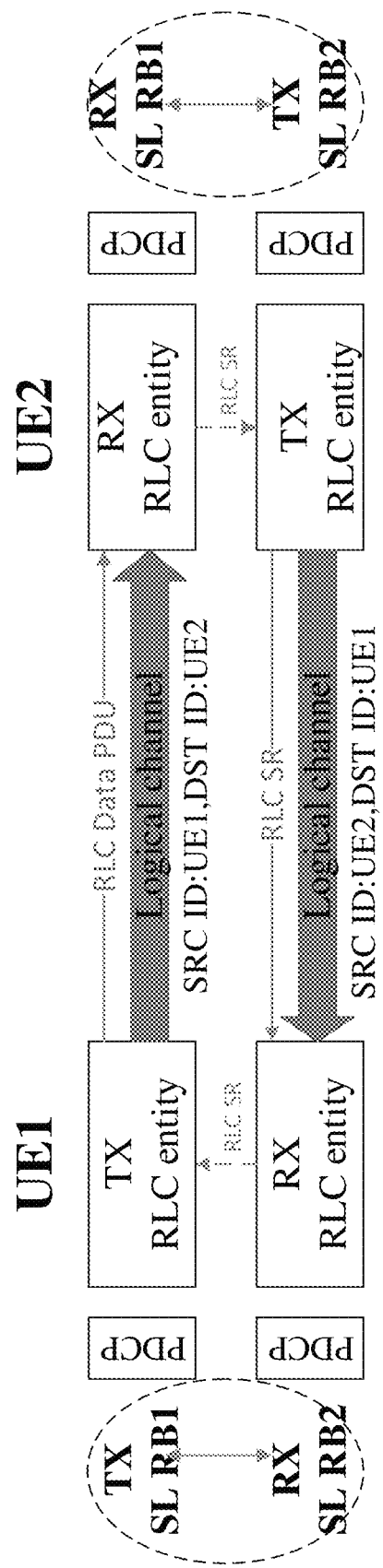
FIG. 17 is a reproduction of graphic 3 of 3GPP R2-1904094.

Assuming UE1 is transmitting data to UE2 and the UE2 feedback the associated RLC SR to UE1, FIG. 17 (graphic 3 of 3GPP R2-1904094) shows the modelling of this option. FIG. 17 is a reproduction of graphic 3 of 3GPP R2-1904094, Entitled "Uni-Directional SL RB for RLC AM"[4]

[4] The naming "SLRBx" in FIGS. 3 and 4 just corresponds to the "SLRB with LCIDx" used in the discussion texts.

Such uni-directional modelling is inherently applied for RLC UM, because there is no association between the RLC data PDU transmitted on the TX bearer and the RLC data PDU received on the RX bearer, so that there is no need to have any relationship between any TX bearer and RX bearer. However, if we also apply such unidirectional SLRB model for RLC AM, the situation becomes different, because there may need to be the association between the RLC data PDU and its RLC SR, i.e.: whether a RLC data PDU in a Tx RLC entity needs to be (re)transmitted depends on the RLC SR received in a corresponding Rx RLC entity (e.g. at UE1 side), and the SR derived by an Rx RLC entity needs to be submitted to the corresponding Tx RLC entity for its transmission (e.g. at the UE2 side). As a consequence, there should be an linkage between the TX SLRB used to transmit the RLC data PDU (RLC SR) and the RX SLRB used to receive the corresponding RLC SR (RLC data PDU), when the involved SLRBs are configured as RLC AM.

Based on the example shown in FIG. 15 (graphic 1 of 3GPP R2-1904094), when UE1 initiates the unicast traffic configured with RLC AM to UE2, UE1 may need to establish both a Tx SLRB and an associated Rx SLRB with UE2:

a) Assume that the LCID of the SL LCH associated with this Tx SLRB established by UE1 (according to NW configuration/pre-configuration) is LCID1, and UE1 tells UE2 in SL that the SL LCH of this SLRB (marked with LCID1) is configured with RLC AM as per the conclusion of the SI phase [2];

b) UE2 may establish an Rx SLRB with LCID1 for the data reception, and accordingly decide that a Tx SLRB with LCID2 is linked to this Rx SLRB and used to transmit the RLC SR for it, i.e. Rx SLRB with LCID 1 is linked with Tx SLRB with LCID2 in UE2. This also means that, from UE1's perspective, it will receive the RLC SR by the RLC entity on the Rx SLRB with LCID2 for its data sent on the Tx SLRB with LCID1;

c) When UE1 transmits RLC data PDU to UE2 with LCID 1, UE2 (when needed) will use the RLC entity of the Tx SLRB with LCID2 to transmit the SR corresponding to the MAC SDU received with LCID1 from UE1, i.e. transmitting the SR as a MAC SDU marked with {LCID2, SRC L2 ID of UE2, DST L2 ID of UE1};

d) After UE1 is made aware of the above "Tx-Rx" SLRB linkage made by UE2, UE1, after receiving that MAC SDU carrying RLC SR, knows that it is delivered from UE2 and should be delivered to the RLC entity of the Rx SLRB with LCID2. Then, based on the linkage UE1 got aware of before, the RLC SR is identified by RLC entity of the Rx SLRB with LCID2 and submitted to the Tx SLRB with LCID1 as the feedback.

Based on above analyses, we see that at least the following issues need to be solved in order to support such uni-directional SLRB modelling for RLC AM: 1) how a UE links an Rx SLRB to a Tx SLRB configured with RLC AM to enable the RLC entity of the later to send RLC SR generated by the former; 2) how the two UEs in a unicast link be aligned with such "Tx-Rx" SLRB linkage (as in above bullet b and d).

Observation 1: If RAN2 intends to adopt the uni-directional SLRB modelling to support RLC AM in unicast, at least the following issues should be addressed first:

How does a UE link an Rx SLRB to a Tx SLRB configure with RLC AM to enable the RLC entity of the later to send RLC SR generated by the former;

How do the two UEs in a unicast link get aligned with each other on such "Tx-Rx" SLRB linkage?

Also note that above operations inevitably needs some forms of interactions between SLRBs within one UE. This factor may also need to be considered when we make the final decision on whether to adopt uni-directional SLRB modelling for RLC AM.

Observation 1a: Inter-SLRB operations within one UE may inevitably be needed for the uni-directional SLRB modelling to support RLC AM in unicast.

Option 2: Bi-directional SLRB modelling for RLC AM

This option is to trying to reuse the modelling of the bi-directional RB with RLC AM in Uu. To be specific, each SLRB includes one PDCP entity, one bi-directional RLC entity and one SL logical channel. Moreover, the LCID of the logical channel is no longer uniquely identified by {SRC L2 ID, DST L2 ID} combination which differentiates who is the source and who is the destination between the two UEs; instead, it should be unique within one unicast connection, e.g. no more differentiation on the order of UE1 ID and UE2 ID included in the {SRC L2 ID, DST L2 ID} combination.

Figure 18:
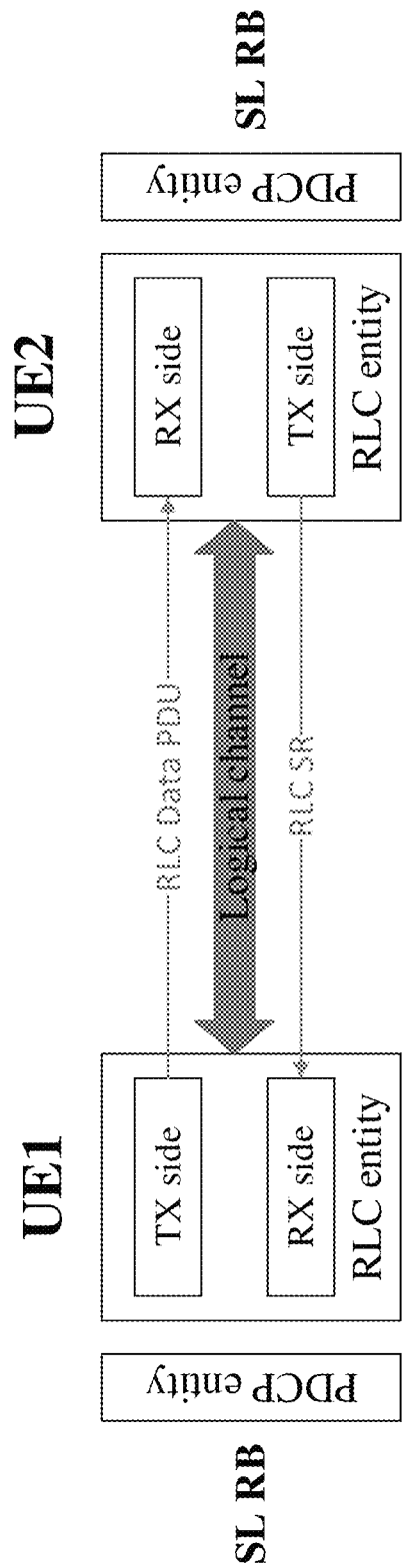
FIG. 18 is a reproduction of graphic 4 of 3GPP R2-1904094.

Assuming UE1 is transmitting data to UE2 and UE2 feedback the associated RLC SR to UE1, FIG. 18 (graphic 4 of 3GPP R2-1904094) shows the modelling of this option. FIG. 18 is a reproduction of graphic 4 of 3GPP R2-1904094, Entitled "Bi-Directional SL RB for RLC AM"

Such bi-directional SLRB modelling has never been applied in LTE SL, so below we may need to analyze how it works with an analogy to NR Uu and based on the agreements we made for NR-configured/pre-configured SLRBs during SI phase.

Based on the example shown in FIG. 18 (graphic 4 of 3GPP R2-1904094), when UE1 initiates the unicast traffic configured with RLC AM to UE2, UE1 established one bi-directional SLRB which includes the Tx side and Rx side as in Uu with UE2, instead of two SLRBs respectively for Tx and Rx as in above Option 1:
  a) Assume that the LCID of the SL LCH associated with this SLRB (as per NW configuration/pre-configuration) established by UE1 is LCID1 which is unique within the unicast connection between UE1 and UE2, and UE1 indicates UE2 in SL that the SL LCH of this SLRB (marked with LCID1) is configured with RLC AM as per the conclusion of the SI phase [2];
  b) Then, UE2 needs to establish a corresponding SLRB with RLC AM and LCID1 also, as per the NW configuration/pre configuration. This SLRB with LCID1 in UE2 not only receives data (i.e. RLC data PDU) with its RLC entity from, but also sends RLC SR to the SLRB with LCID1 in UE1. Additionally, at the UE1 side, the SLRB with LCID1 will receive, by its Rx side, the SR for its own data transmission. These mean that UE2 needs to be ensured to have also RLC AM on the SLRB with LCID1, i.e. being aligned with UE1 on the SLRB with the same LCID;
  c) When UE1 transmits RLC data PDU to UE2 with LCID1, UE2 (when needed) will use the RLC entity of the SLRB with LCID1 to transmit the SR corresponding to the RLC PDU with the same LCID value from UE1, i.e. transmitting the SR as a MAC SDU marked with LCID1 and the connection ID between UE1 and UE2 (e.g. identified by the combination of {UE1 ID, UE2 ID} without order);
  d) Since in this bi-directional SLRB option the SR received with an LCID automatically applies to the RLC entity associated with the same LCID, UE1 after receiving that MAC SDU, first knows this MAC SDU is delivered from UE2 to itself, and should be delivered to the RLC entity of the SLRB with LCID1. Then, the RLC SR is identified by the RLC entity of SLRB with LCID1 inside UE1 as the feedback for the previous data transmission.

Based on the above analyses, we see that at least an issue as follows needs to be solved, i.e: if a UE has already established a bi-directional SLRB with RLC AM, how to ensure its peer UE to have the same RLC mode on the SLRB with the same LCID as per also NW-/pre-configuration (i.e. to avoid RLC mode misalignments)? This is crucial, since if the peer UE is configured by the NW or following pre-configuration to establish an RLC UM based SLRB with the same LCID, no ARQ feedback would be able to be transmitted, so that the RLC AM is then not actually supported on this SLRB.

Observation 2: If RAN2 intends to adopt the bi-directional SLRB modelling to support RLC AM in unicast, at least this issue should be first addressed: if one of the UEs has already established a bi-direction SLRB with RLC AM via NR-configuration/per-configuration, how to ensure its peer UE to be also (pre-)configured with RLC AM on the SLRB with the same LCID?

It is further noted that, specifically for the case a UE requests dedicated SLRB configurations from the gNB (e.g. when the UE is in RRC_CONNECTED), it may require the gNB of the UE to configure an SLRB by following the RLC mode of its peer UE, if the peer UE had already established the SLRB of the same LCID with RLC AM before and indicated this to that UE in SL.

Observation 2a: In bi-directional SLRB modelling, when the gNB configures an SLRB to a UE as requested (e.g. when the UE is in RRC_CONNECTED), it may inevitably has to follow the RLC mode already adopted and indicated by its peer UE on the SLRB with the same LCID.

Above, the basic issues on supporting uni-directional or bi-directional SLRBs for SL unicast RLC AM were elaborated respectively. RAN2 is suggested to choose the SLRB modelling for SL RLC AM support by taking into account the above issues.

Proposal 2: RAN2 to decide whether to adopt uni-directional or bi-directional SLRB modelling for RLC AM support in SL unicast, by taking into account their issues as shown in above Observations.

Figure 19:
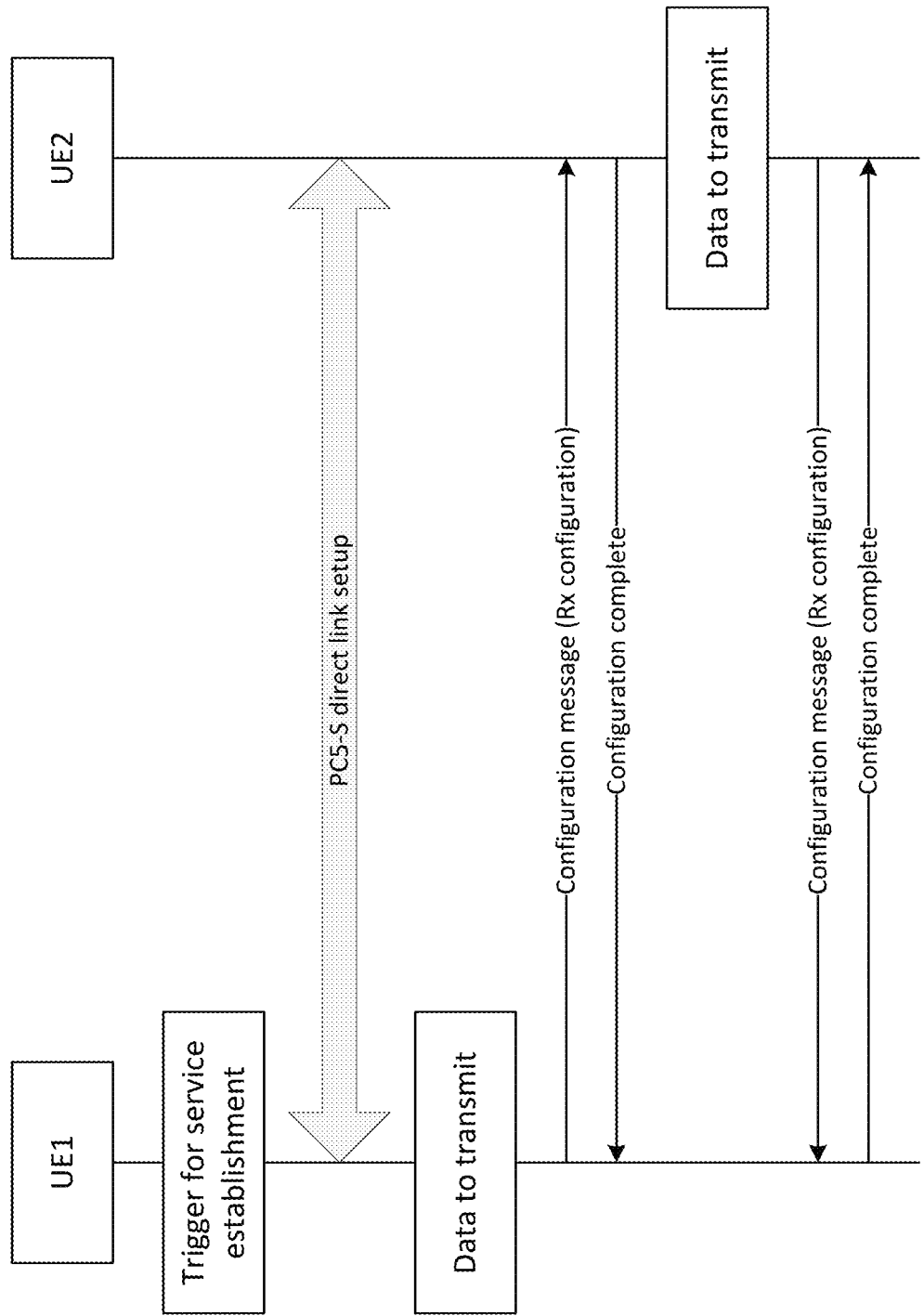
FIG. 19 is a reproduction of graphic 1 of 3GPP R2-1903227.

3GPP R2-1903227 states:
If the Rx UE needs to transmit traffic, it can configure the (original) Tx UE with a reception configuration using a new configuration message. This leads to the flow shown in FIG. 19 (graphic 1 of 3GPP R2-1903227) 19 is a reproduction of, where UE1 is the initial Tx UE and UE2 is the initial Rx UE. FIG. 19 is a reproduction of graphic 1 of 3GPP R2-1903227, Entitled "PC5-RRC Configuration in Both Directions"

Proposal 4: If the Rx UE needs to transmit data, it sends a new configuration message to the (previous) Tx UE with a reception configuration.

3GPP Summary of [105bis #32] PC5-RRC signalling states:

2.2 Issue-2: AS-Layer Configuration
According to the conclusion from RAN2 #105, there is just one option for AS-layer configuration.

Figure 20:
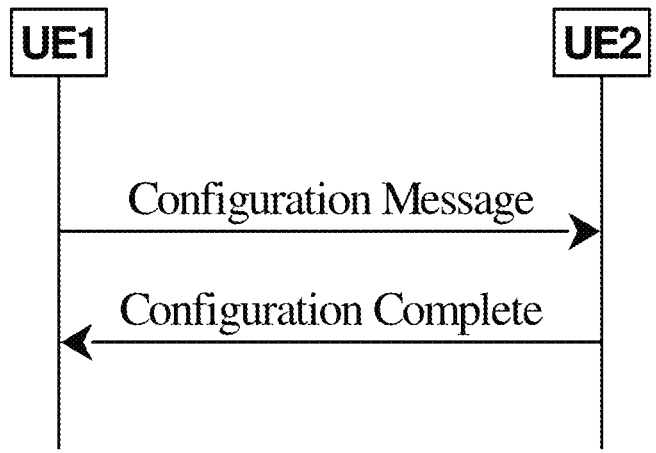
FIG. 20 is a reproduction of graphic 5 of 3GPP Summary of [105bis #32] PC5-RRC signalling.

FIG. 20 is a reproduction of graphic 5 of 3GPP Summary of [105bis #32] PC5-RRC Signalling, Entitled "SL AS Layer Configuration Information Flow, Successful"

The first issue is the necessity of a failure case, if see the above case as a successful case (The annotation in the figures are just for illustration, but not to conclude on the naming of the procedure).

Figure 21:
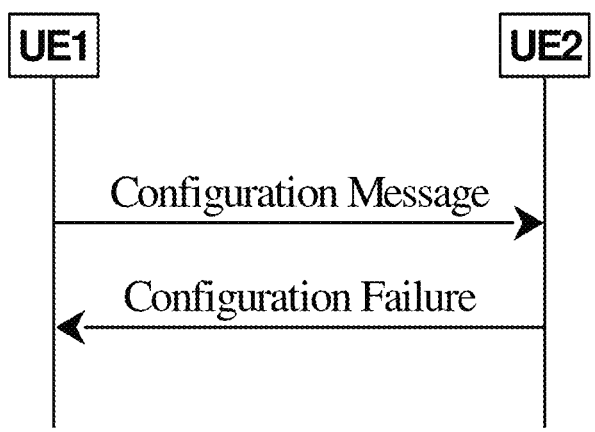
FIG. 21 is a reproduction of graphic 1 of 3GPP Summary of [105bis #32] PC5-RRC signalling.

FIG. 21 is a reproduction of graphic 2 of 3GPP Summary of [105bis #32] PC5-RRC Signalling, Entitled "SL AS Layer Configuration Information Flow, Failure"

As discussed in 3GPP R2-1900370, options for NW-configured SLRB configuration and pre-configured SLRB configuration for PC5 QoS (Quality of Service) flow based and PC5 QoS profile based were introduced. The SLRB configuration may include SLRB ID(s), QoS flow-to-SLRB mapping, and AS (Access Stratum) configuration (e.g. PDCP (Packet Data Convergence Protocol)/RLC (Radio Link Control)/LCH (Logical Channel) configurations). The AS configuration could indicate, for example, t-Reordering, Reordering_Window, Maximum_PDCP_SN, RLC mode (UM (Unacknowledged Mode) or AM (Acknowledged Mode)), AM_Window_Size, UM_Window_Size, identity of sidelink logical channel, and/or etc.

To support RLC AM for SLRB in NR unicast, whether the SLRB with RLC AM should be modelled as uni-directional bearer or bi-directional bearer was introduced in 3GPP R2-1904094. In NR Uu, the radio bearer configured with RLC AM is a bi-directional bearer, which includes one PDCP entity, one RLC entity and one logical channel. The RLC entity consists of a transmitting side and a receiving side. The RLC data PDU and the RLC status report are transmitted and received via the same RLC entity and the same logical channel (i.e. with same LCID). In LTE SL, only RLC UM is supported for the SLRB. The LCID of each SLRB is unique within the scope of one Source Layer-2 ID (SRC L2 ID) and Destination Layer-2 ID (DST L2 ID) combination, no matter for unicast and groupcast in D2D communication or for broadcast in V2X SL communication. This means that an SL radio bearer, along with its associated PDCP/RLC entity and SL LCH in LTE SL unicast is uni-directional, either used for transmission only or reception only.

Considering the case where one UE is in RRC idle mode and the peer UE is in RRC connected mode, it does not seem to be a good solution for either one UE to get the SLRB configuration for both directions (based on gNB configuration or pre-configuration) and forward it to the other UE to follow. For example, UE1 in RRC idle mode sends the SLRB configuration determined according to pre-configuration (or system information broadcasted by a base station) to UE2, which requires the gNB connecting to the UE2 to schedule the UE2 based on the SLRB configuration determined according to pre-configuration. Or, the UE1 in RRC connected mode sends the SLRB configuration configured by gNB to UE2, which requires UE2 in RRC idle mode to use the SLRB configuration configured by gNB. Therefore, uni-directional SLRB for RLC AM (using separate sidelink logical channels) seems more proper for such scenarios. This concept may also be applied to other scenarios e.g. both UEs are in connected mode.

Given uni-directional SLRB for RLC AM, there is one issue after the UE1 gets the SLRB configuration for Tx direction (based on gNB configuration or pre-configuration) and forward it to the UE2—i.e. it is not proper for the UE1 to start transmitting the packets (of a PC5 QoS flow) on the SLRB with RLC AM because the SLRB configuration for the counter (or opposite) direction to the UE1 has not been allocated and as a default the UE1 cannot receive the RLC status report indicating RLC ACK/NACK from the UE2. According to 3GPP R2-1903227, if the UE1 needs to transmit traffic to the UE2, it can configure the UE2 with a SLRB configuration for reception using a new configuration message. In order to configure the UE1 with SLRB configuration for reception, the UE2 needs to request the gNB for the SLRB configuration for reception on the UE1. Similarly, the UE2 cannot transmit the request for the SLRB configuration until a packet from the same QoS flow arrives at the UE2. In this situation, the UE1 cannot transmit sidelink packets (of the PC5 QoS flow) on the SLRB until sidelink packets arrive at the UE2 that triggers the UE2 to send the SLRB configuration to the UE1. This situation would cause latency on sidelink transmission. Therefore, the UE2 could request the gNB to configure the SLRB configuration for UE2-to-UE1 direction when it receives the SLRB configuration for UE1-to-UE2 direction from the UE1.

For example, the UE1 transmits a first SLRB configuration to the UE2, and the first SLRB configuration indicates a first SLRB ID for a SLRB with RLC AM. In response to reception of the first SLRB configuration, the UE2 transmit a request for SLRB configuration message to the gNB, and the gNB provides the NW-configured SLRB configuration to the UE2. And then, the UE2 transmits a second SLRB configuration based on the NW-configured SLRB configuration to the UE1. Regarding SLRB ID, there may be two options: (1) different SLRB IDs are used for separate directions and (2) same SLRB ID is used for separate directions. If different SLRB IDs are used, the UE2 may need to indicate the first SLRB ID in the request for SLRB configuration message; and if same SLRB ID is used, the first SLRB ID may not be needed in the request for SLRB configuration message, and the gNB may allocate a second SLRB ID for the SLRB in the NW-configured SLRB configuration.

Alternatively, the first SLRB ID may be still included in the request for SLRB configuration message, and the gNB may allocate a second SLRB ID for the SLRB in the NW-configured SLRB configuration. Since the first SLRB ID and the second SLRB ID are associated with the same PC5 QoS flow, the first SLRB ID is paired with the second SLRB ID to support RLC AM for the same PC5 QoS flow. Possibly, the first SLRB ID and the second SLRB ID may be the same.

Figure 22:
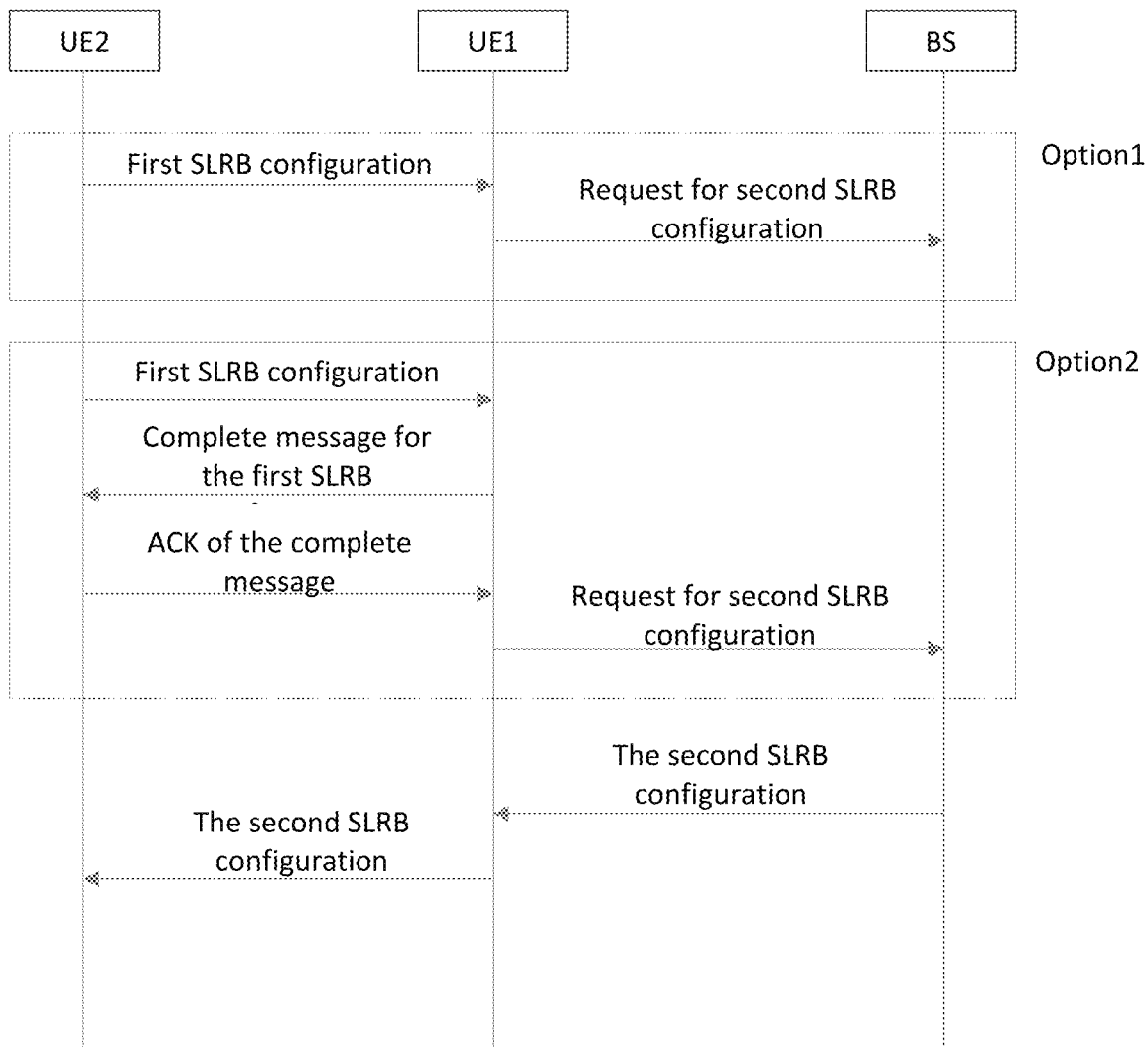
FIG. 22 is a diagram according to one exemplary embodiment.

It is possible that UE2 may need to reply a complete message to UE2 in response to reception of the message including the first SLRB configuration from UE1. In this situation, another potential timing for UE2 to request the second SLRB configuration from gNB is when successful transmission of the complete message has been confirmed by a lower layer (e.g. RLC layer, MAC layer or PHY layer). The transmission of the complete message can be confirmed by e.g. RLC acknowledgement or HARQ feedback acknowledgement associated with the transmission of the complete message. The above solutions could be illustrated in FIG. 22.

Figure 23:
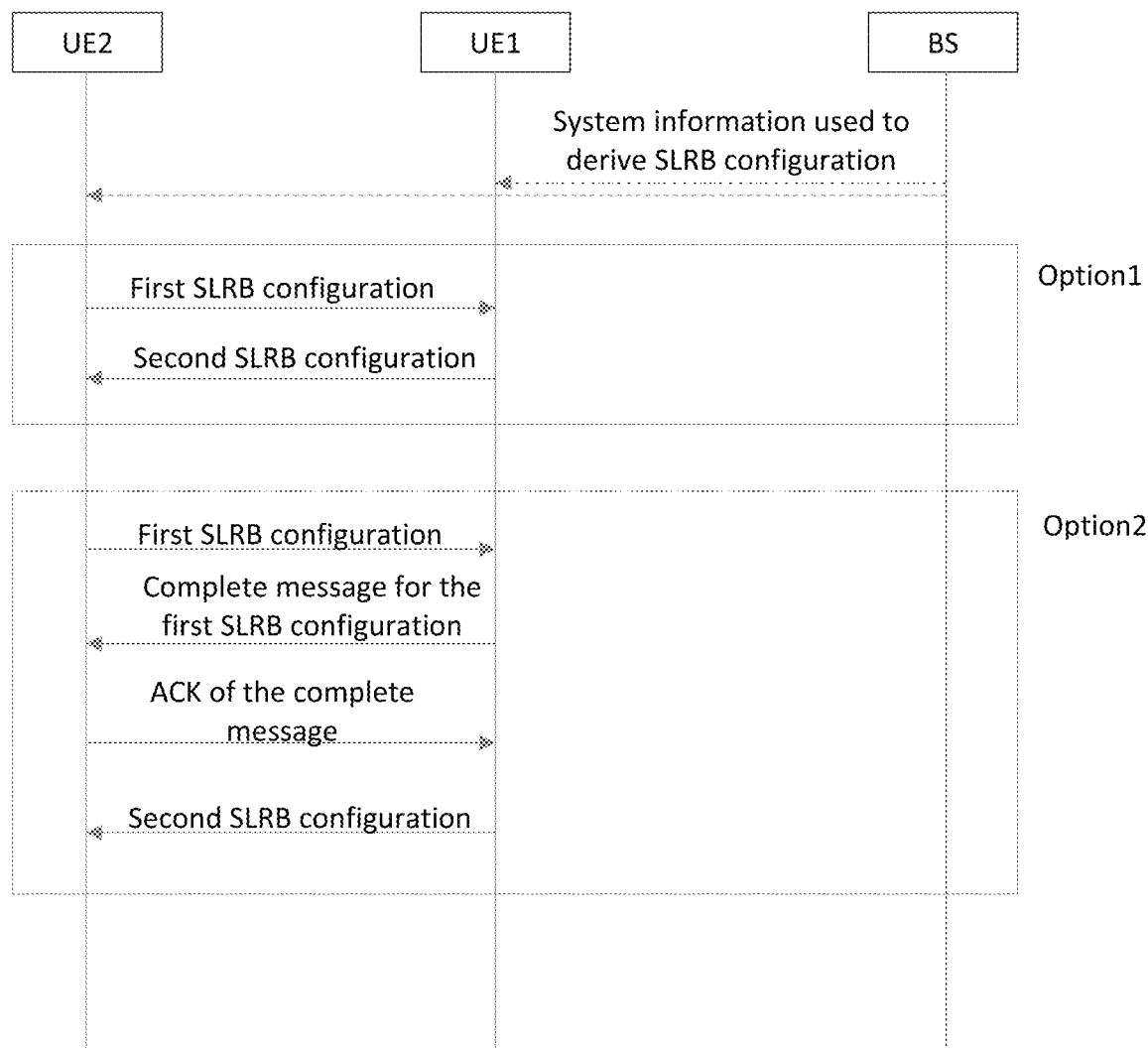
FIG. 23 is a diagram according to one exemplary embodiment.

If both UE1 and UE2 are in RRC idle or inactive mode, the UE2 does not transmit the request for SLRB configuration message to the gNB when it receives the first SLRB configuration from the UE1. Similarly, the UE1 cannot start to transmit the packets on the SLRB with RLC AM until the UE2 forwards the SLRB configuration for the counter (or opposite) direction to the UE1. Therefore, the UE2 could derive the second SLRB configuration according to system information broadcasted by the gNB or pre-configuration in the UE2 when/if it receives the first SLRB configuration from the UE1 and transmit the second SLRB configuration to the UE1. Alternatively, the UE2 could derive the second SLRB configuration when/if a complete message in response to reception of a message including the first SLRB configuration is transmitted to the UE 1 successfully. Possibly, whether the transmission of the complete message has been transmitted successfully can be confirmed by reception of RLC acknowledgement or HARQ feedback acknowledgement associated with the transmission of the complete message. This concept may also be applied to the case where UE1 is in connected mode and UE2 is in idle/inactive mode. This solution could be illustrated in FIG. 23.

If UE1 is in RRC idle mode and UE2 is in RRC connected mode, the UE2 may need to transmit a request for the SLRB configuration to the gNB. The UE2 may transmit the second SLRB configuration based on the NW-configured SLRB configuration to the UE1. Normally, the UE1 replies a complete message to the UE2 in response to reception of a message including the second SLRB configuration. As discussed in the 3GPP Summary of [105bis #32] PC5-RRC signalling, handling failure case for the reception of the SLRB configuration is discussed. If the UE2 receives a failure message from the UE1 in response to transmission of the message including the second SLRB configuration, the UE2 may need to inform this failure case to the gNB, and the gNB may release the NW-configured SLRB configuration. This case would cause signalling overhead.

Another signalling flow could be that the both UEs could first complete exchanging SLRB configurations (each SLRB configuration from each UE could be derived from system information or pre-configuration) with each other, and the UE in RRC connected mode then transmits a message used to request configuration related to sidelink transmissions on the unicast link (including e.g. mapping of QoS flow ID-to-SLRB ID, mapping of SLRB ID-to-LCG and/or etc., where the SLRB ID is assigned by UE, and an identity of the LCG is assigned by gNB). The message used to request the configuration related to sidelink transmissions on the unicast link could include e.g. SLRB ID, PC5 QoS flow ID and/or etc.

Figure 24:
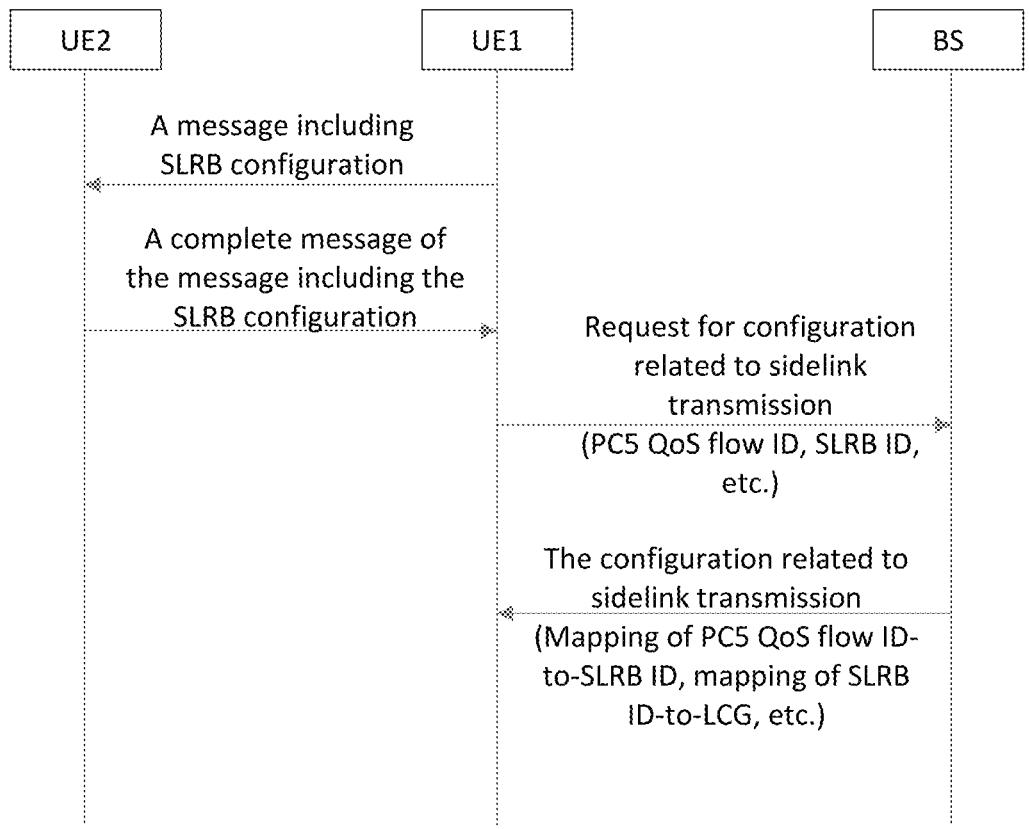
FIG. 24 is a diagram according to one exemplary embodiment.

For example, the UE1 transmits a first SLRB configuration to the UE2, and the first SLRB configuration indicates a first SLRB ID for a SLRB with RLC AM. In response to reception of a message including the first SLRB configuration, the UE2 transmit a complete message to the UE1. And then, the UE2 transmits a second SLRB configuration to the UE1, and the second SLRB configuration indicates a second SLRB ID (or the first SLRB ID) for the SLRB with RLC AM. In response to reception of a message including the second SLRB configuration, the UE1 transmit a complete message to the UE2. Upon reception of the complete message, the UE2 transmits a message used to request configuration related to sidelink transmissions on the unicast link to the gNB, and then the gNB provides the configuration related to sidelink transmissions on the unicast link to the UE1. This solution could be illustrated in FIG. 24.

Figure 25:
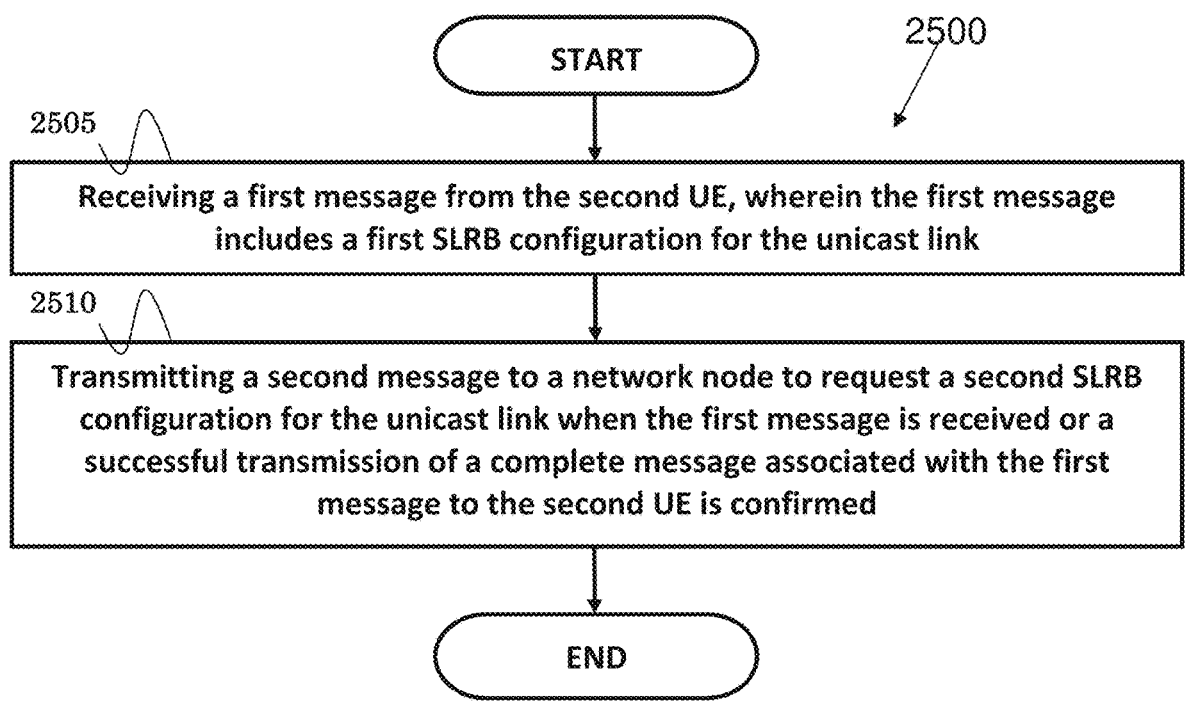
FIG. 25 is a flow chart according to one exemplary embodiment.

FIG. 25 is a flow chart 2500 according to one exemplary embodiment from the perspective of a first UE to request SLRB configuration for a unicast link with a second UE. In step 2505, the first UE receives a first message from the second UE, wherein the first message includes a first SLRB configuration for the unicast link. In step 2510, the first UE transmits a second message to a network node to request a second SLRB configuration for the unicast link when the first message is received or a successful transmission of a complete message associated with the first message to the second UE is confirmed.

In one embodiment, the first UE could receive a third message from the network node, wherein the third message includes the second SLRB configuration. The first UE could also transmit a fourth message to the second UE, wherein the fourth message includes the second SLRB configuration.

In one embodiment, the first message could include an identity of a PC5 QoS flow for the unicast link. The second message could include an identity of a PC5 QoS flow.

In one embodiment, the first SLRB configuration may be applied for receiving packets from the second UE, and the second SLRB configuration may be applied for transmitting packets to the second UE. The first message could be a PC5 RRC message. The fourth message could be a PC5 RRC message.

In one embodiment, the first UE could be in RRC_CONNECTED. The network node could be a base station (e.g., a gNB).

Referring back to FIGS. 3 and 4, in one exemplary embodiment of a UE, the device 300 includes a program code 312 stored in the memory 310. The CPU 308 could execute program code 312 to enable the first UE (i) to receive a first message from a second UE, wherein the first message includes a first SLRB configuration for the unicast link, and (ii) to transmit a second message to a network node to request a second SLRB configuration for the unicast link when the first message is received or a successful transmission of a complete message associated with the first message to the second UE is confirmed. Furthermore, the CPU 308 can execute the program code 312 to perform all of the above-described actions and steps or others described herein.

Figure 26:
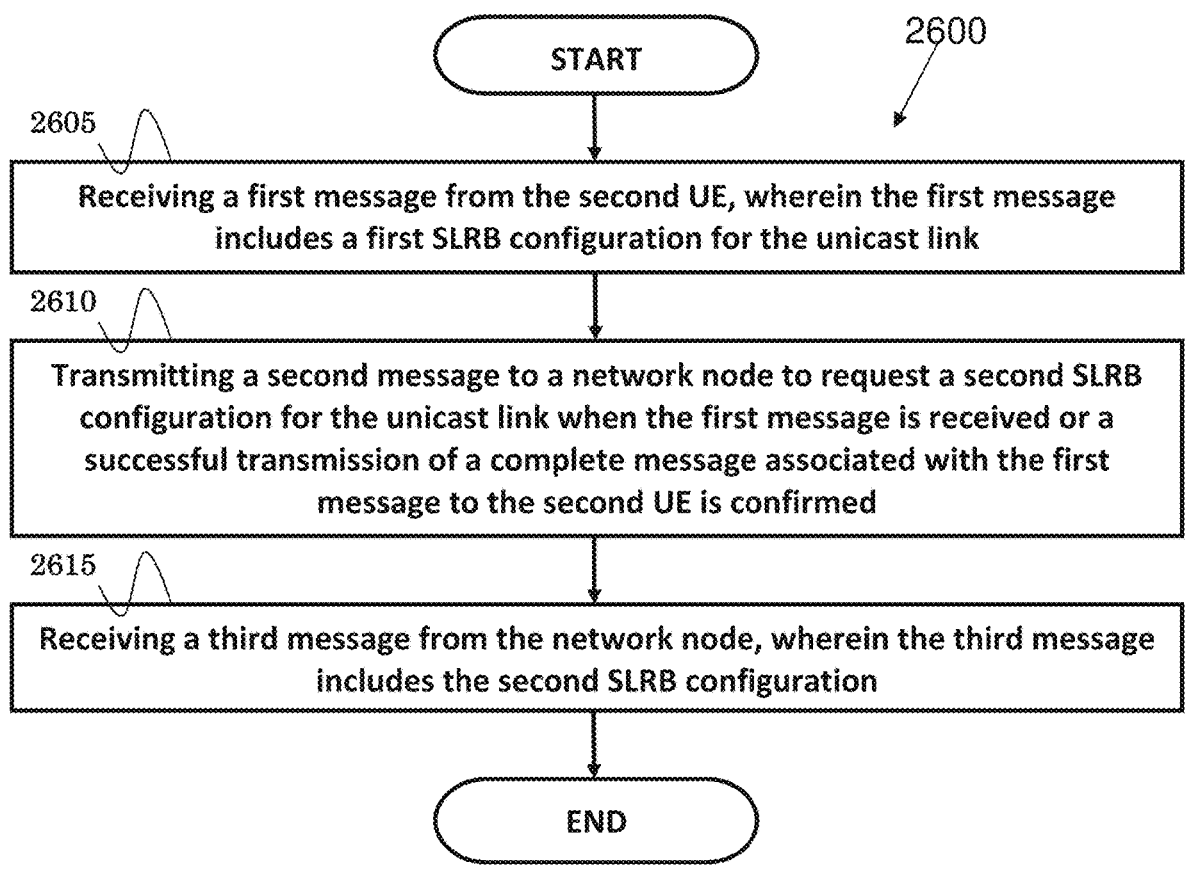
FIG. 26 is a flow chart according to one exemplary embodiment.

FIG. 26 is a flow chart 2600 according to one exemplary embodiment from the perspective of a first UE to request SLRB configuration for a unicast link with a second UE. In step 2605, the first UE receives a first message from the second UE, wherein the first message includes a first SLRB configuration for the unicast link. In step 2610, the first UE transmits a second message to a network node to request a second SLRB configuration for the unicast link when the first message is received or a successful transmission of a complete message associated with the first message to the second UE is confirmed. In step 2615, the first UE receives a third message from the network node, wherein the third message includes the second SLRB configuration.

In one embodiment, the first UE could transmit a fourth message to the second UE, wherein the fourth message includes the second SLRB configuration. The first message may include an identity of a PC5 QoS flow for the unicast link. The second message may include the identity of the PC5 QoS flow. The third message may include the identity of the PC5 QoS flow.

In one embodiment, the first message may include an identity of a first SLRB associated with the first SLRB configuration. The second message may include an identity of a second SLRB associated with the second SLRB configuration. The identity of the second SLRB may be assigned by the first UE. The identity of the second SLRB may be equal to the identity of the first SLRB.

In one embodiment, the second message may not include an identity of a second SLRB associated with the second SLRB configuration. The identity of the second SLRB may be assigned by the network node.

In one embodiment, the third message may include the identity of the second SLRB associated with the second SLRB configuration. The fourth message may include information to indicate an association between the first SLRB configuration and the second SLRB configuration.

In one embodiment, the first SLRB configuration may be applied for receiving packets from the second UE, and the second SLRB configuration may be applied for transmitting packets to the second UE. The network node could be a base station (e.g., a gNB).

In one embodiment, the first message and/or the fourth message could be a PC5 RRC message. The second message could be a RRC message including UE assistance information. The third message could be a RRC reconfiguration message.

In one embodiment, the first UE could be in RRC_CONNECTED. The second UE could be in RRC_CONNECTED, RRC_IDLE, or RRC_INACTIVE. The first SLRB and/or the second SLRB could be associated with the identity of the PC5 QoS flow.

In one embodiment, the complete message could be transmitted by the first UE to the second UE in response to reception of the first message. The successful transmission of the complete message associated with the first message to the second UE could be confirmed based on a RLC acknowledgement or a HARQ feedback acknowledgement associated with the complete message.

Referring back to FIGS. 3 and 4, in one exemplary embodiment of a first UE, the device 300 includes a program code 312 stored in the memory 310. The CPU 308 could execute program code 312 to enable the first UE (i) to receive a first message from a second UE, wherein the first message includes a first SLRB configuration for the unicast link, (ii) to transmit a second message to a network node to request a second SLRB configuration for the unicast link when the first message is received or a successful transmission of a complete message associated with the first message to the second UE is confirmed, and (iii) to receive a third message from the network node, wherein the third message includes the second SLRB configuration. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a first User Equipment (UE) to request Sidelink Radio Bearer (SLRB) configuration for a unicast link with a second UE, comprising:

receiving a first message from the second UE, wherein the first message includes a first SLRB configuration applied for receiving packets from the second UE and indicating a RLC (Radio Link Control) mode of a first SLRB used for transmission from the second UE to the first UE;

transmitting a second message to a network node to request a second SLRB configuration of a second SLRB applied for transmitting packets from the first UE to the second UE for the unicast link, wherein the second message includes an identity of a PC5 Quality of Service (QoS) flow; and receiving a third message from the network node, wherein the third message includes the identity of the PC5 QoS flow and the RLC mode.

2. The method of claim 1, further comprising transmitting a fourth message to the second UE.

3. The method of claim 2, wherein the fourth message includes the second SLRB configuration.

4. The method of claim 2, wherein the fourth message includes information indicating an association between the first SLRB configuration and the second SLRB configuration.

5. The method of claim 2, wherein the fourth message is a PC5 Radio Resource Control (RRC) message.

6. The method of claim 1, wherein the first message is a PC5 Radio Resource Control (RRC) message.

7. The method of claim 1, wherein the first message includes an identity of a PC5 QoS (Quality of Service) flow for the unicast link.

8. The method of claim 1, wherein the first UE is in RRC_CONNECTED.

9. The method of claim 1, wherein the network node is a base station.

10. A first User Equipment (UE) to request Sidelink Radio Bearer (SLRB) configuration for a unicast link with a second UE, comprising:

a processor; and a memory operatively coupled to the processor, wherein the processor executes a program code to:

receive a first message from the second UE, wherein the first message includes a first SLRB configuration applied for receiving packets from the second UE and indicating a Radio Link Control (RLC) mode of a first SLRB used for transmission from the second UE to the first UE;

transmit a second message to a network node to request a second SLRB configuration of a second SLRB applied for transmitting packets from the first UE to the second UE for the unicast link, wherein the second message includes an identity of a PC5 Quality of Service (QoS) flow; and receive a third message from the network node, wherein the third message includes the identity of the PC5 QoS flow and the RLC mode.

11. The first UE of claim 10, wherein the processor further executes a program code to transmit a fourth message to the second UE.

12. The first UE of claim 11, wherein the fourth message includes the second SLRB configuration.

13. The first UE of claim 11, wherein the fourth message includes information indicating an association between the first SLRB configuration and the second SLRB configuration.

14. The first UE of claim 11, wherein the fourth message is a PC5 Radio Resource Control (RRC) message.

15. The first UE of claim 10, wherein the first message is a PC5 Radio Resource Control (RRC) message.

16. The first UE of claim 10, wherein the first message includes an identity of a PC5 QoS (Quality of Service) flow for the unicast link.

17. The first UE of claim 10, wherein the first UE is in RRC_CONNECTED.

18. The first UE of claim 10, wherein the network node is a base station.

* * * * *